US012661884B2

(12) United States Patent
Mori et al.

(10) Patent No.: US 12,661,884 B2
(45) Date of Patent: Jun. 23, 2026

(54) LIQUID EJECTION HEAD

(71) Applicant: CANON KABUSHIKI KAISHA, Tokyo (JP)

(72) Inventors: Tatsurou Mori, Tokyo (JP); Shuzo Iwanaga, Kanagawa (JP); Hiromasa Amma, Kanagawa (JP); Shingo Okushima, Kanagawa (JP); Satoshi Kimura, Kanagawa (JP); Koichi Ishida, Tokyo (JP); Tomohiro Takahashi, Kanagawa (JP); Hiroaki Mihara, Tokyo (JP); Yuhei Oikawa, Tokyo (JP); Takatoshi Nakano, Kanagawa (JP); Yoshihiro Hamada, Kanagawa (JP); Fumi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 18/397,115

(22) Filed: Dec. 27, 2023

(65) Prior Publication Data

US 2024/0217233 A1 Jul. 4, 2024

(30) Foreign Application Priority Data

Dec. 28, 2022 (JP) ................................. 2022-211846
Oct. 10, 2023 (JP) ................................. 2023-175278

(51) Int. Cl.
*B41J 2/155* (2006.01)
*B41J 2/14* (2006.01)
(Continued)

(52) U.S. Cl.
CPC ....... *B41J 2/14024* (2013.01); *B41J 2/14032* (2013.01); *B41J 2/155* (2013.01);
(Continued)

(58) Field of Classification Search
CPC .... B41J 2/14024; B41J 2/14032; B41J 2/155; B41J 2/1601; B41J 2/17596; B41J 2/18
See application file for complete search history.

(56) References Cited

U.S. PATENT DOCUMENTS

2005/0174388 A1* 8/2005 Miyamoto ............ B41J 2/1628 347/56
2006/0057503 A1* 3/2006 Bertelsen .............. B41J 2/1646 430/320
2020/0047499 A1* 2/2020 Yamazaki .............. B41J 2/1623

FOREIGN PATENT DOCUMENTS

JP 4-234665 A 8/1992
JP 2006-334910 A 12/2006

OTHER PUBLICATIONS

Extended European Search Report, dated May 22, 2024, in European Patent Application No. 23216622.3 (7 pages).

* cited by examiner

*Primary Examiner* — Jason S Uhlenhake
(74) *Attorney, Agent, or Firm* — Venable LLP

(57) ABSTRACT

A liquid ejection head includes a printing element substrate including an ejection surface provided with a first ejection orifice array in which ejection orifices configured to be capable of ejecting a liquid are arranged in plurality in an array direction and a second ejection orifice array arranged in a direction intersecting with the array direction and the first ejection orifice array; and a protective member provided with a first opening corresponding to the first ejection orifice array and a second opening corresponding to the second ejection orifice array. The protective member is arranged adjacent to the ejection surface of the printing element substrate via an adhesive arranged between the first ejection orifice array and the second ejection orifice array.

27 Claims, 26 Drawing Sheets

(51) Int. Cl.
*B41J 2/16* (2006.01)
*B41J 2/175* (2006.01)
*B41J 2/18* (2006.01)

(52) U.S. Cl.
CPC ........... *B41J 2/1601* (2013.01); *B41J 2/1623* (2013.01); *B41J 2/17596* (2013.01); *B41J 2/18* (2013.01); *B41J 2002/14411* (2013.01)

LIQUID EJECTION HEAD

BACKGROUND OF THE INVENTION

Field of the Invention

The present disclosure relates to a liquid ejection head.

Description of the Related Art

Line liquid ejection apparatuses are known which perform high-speed printing using a liquid ejection head corresponding to a width of a printed medium on which a plurality of printing element substrates are arranged. During continuous single-pass printing while continuously or intermittently conveying a plurality of printed media, a printed medium being conveyed may float upward and come into contact with a printing element substrate and damage the liquid ejection head. Japanese Patent Laid-Open No. 2006-334910 (hereinafter, referred to as Literature 1) and Japanese Patent Laid-Open No. H4-234665 (hereinafter, referred to as Literature 2) disclose configurations in which a protective member made of resin or metal is bonded to an ejection surface which forms an ejection orifice.

However, with the configuration disclosed in Literature 1, there is a risk that the protective member may flake off from the ejection surface depending on an amount or an application method of an adhesive. In addition, with the configuration disclosed in Literature 2, there is a concern that the protective member may flake off due to a shape of the protective member or stress created by a difference in coefficients of linear expansion between materials of the protective member and the ejection surface.

SUMMARY OF THE INVENTION

A liquid ejection head according to the present disclosure includes: a printing element substrate including an ejection surface provided with a first ejection orifice array in which an ejection orifice configured to be capable of ejecting a liquid is arranged in plurality in an array direction and a second ejection orifice array arranged in a direction intersecting with the array direction and the first ejection orifice array; and a protective member provided with a first opening corresponding to the first ejection orifice array and a second opening corresponding to the second ejection orifice array, wherein the protective member is arranged adjacent to the ejection surface of the printing element substrate via an adhesive arranged between the first ejection orifice array and the second ejection orifice array.

Further features of the present invention will become apparent from the following description of exemplary embodiments with reference to the attached drawings.

DETAILED DESCRIPTION OF THE PREFERRED EMBODIMENTS

Hereinafter, examples of embodiments of the present disclosure will be described with reference to the drawings.

However, it is to be understood that the following description is not intended to limit the scope of the present disclosure. As an example, while a thermal system which generates bubbles using a heating element to eject a liquid is adopted in the present embodiments, the present disclosure can also be applied to liquid ejection heads adopting a piezoelectric system and other various liquid ejection systems.

While the present embodiments represent an inkjet printing apparatus (printing apparatus) formed so as to circulate a liquid such as ink between a tank and a liquid ejection head, the inkjet printing apparatus may be given other forms. For example, instead of circulating ink, the inkjet printing apparatus may be provided with two tanks, respectively, on an upstream side and a downstream side of a liquid ejection head and may be formed to cause ink inside a pressure chamber to flow by supplying the ink from one tank to the other tank.

In addition, while the present embodiments represent a so-called line head having a length corresponding to a width of a printed medium (print medium, printing medium), the present disclosure can also be applied to a so-called serial liquid ejection head which performs printing while scanning a printed medium. An example of a serial liquid ejection head is a configuration which is respectively mounted with one printing element substrate for black ink and one printing element substrate for color ink. The liquid ejection head according to the present disclosure is not limited thereto and may be formed so as to create a short line head which is shorter than a width of a printed medium and in which several printing element substrates are arranged so that ejection orifices overlap with each other in an ejection orifice array direction and to scan the printed medium with the short line head.

<Description of Basic Configuration of Present Disclosure>

(Description of Inkjet Printing Apparatus)

Figure 1:
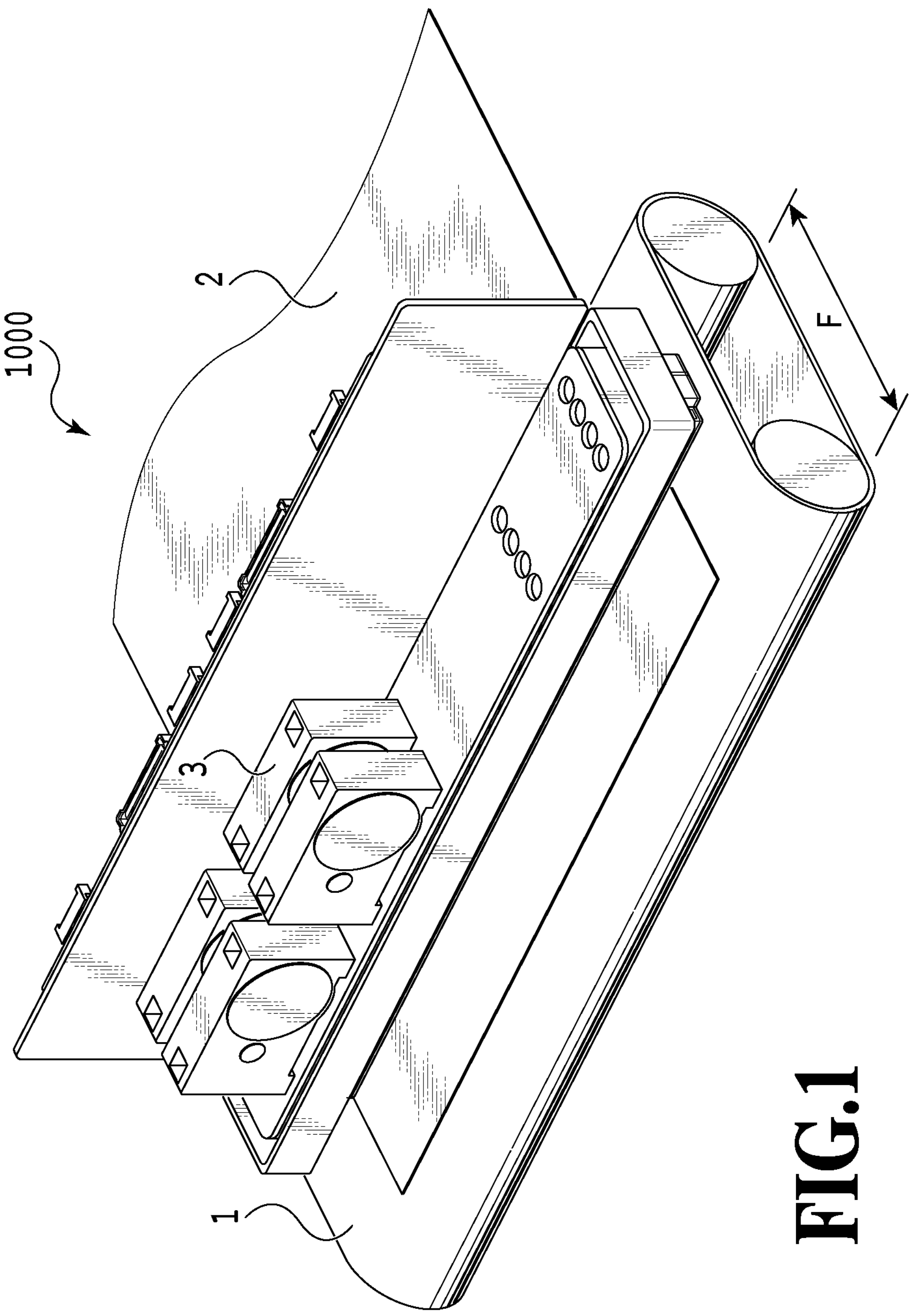
FIG. 1 is a schematic configuration diagram of an inkjet printing apparatus according to the present disclosure.

FIG. 1 shows a schematic configuration of an apparatus which ejects a liquid or, more particularly, an inkjet printing apparatus 1000 (hereinafter, also referred to as a printing apparatus) which performs printing by ejecting ink according to the present disclosure. The printing apparatus 1000 is a line printing apparatus which includes a conveying section 1 which conveys a printed medium 2 and a line liquid ejection head 3 which is arranged approximately orthogonal to a conveying direction of the printed medium and which performs continuous single-pass printing while continuously or intermittently conveying a plurality of printed media 2. The printed medium 2 is not limited to cut paper and may be continuous rolled paper. The liquid ejection head 3 is capable of full-color (cyan, magenta, yellow, and black) printing using CMYK ink. In addition, as will be described later, liquid supplying means which is a supply path for supplying a liquid to the liquid ejection head, a main tank, and a buffer tank (refer to FIG. 2) are fluidically connected to the liquid ejection head 3. Furthermore, an electric control section which transmits power and ejection control signals to the liquid ejection head 3 is electrically connected to the liquid ejection head 3. A liquid path and an electric signal path in the liquid ejection head 3 will be described later.

(Description of Circulation Path)

Figure 2:
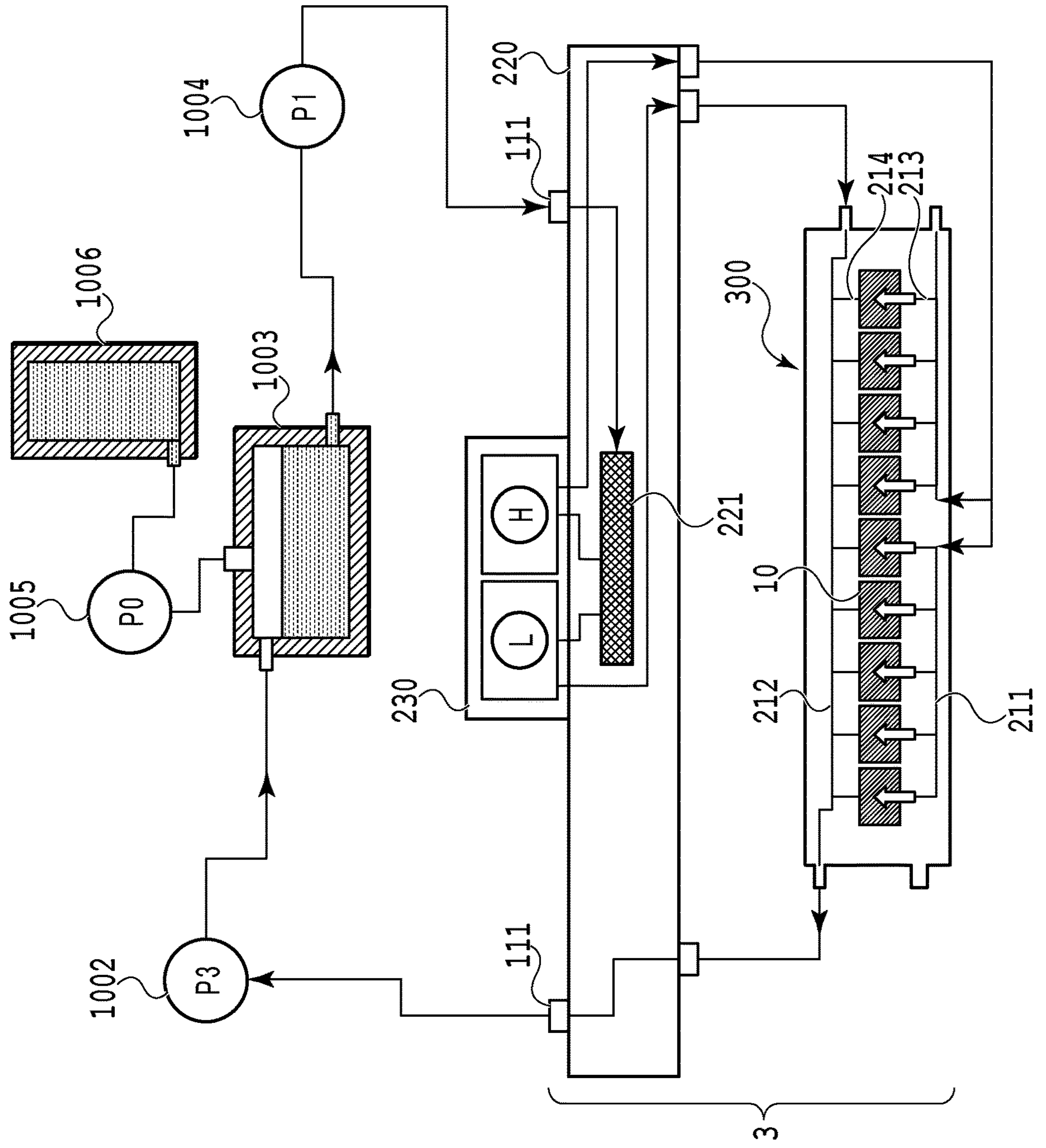
FIG. 2 is a schematic view of a liquid circulation path of the inkjet printing apparatus according to the present disclosure.

FIG. 2 is a schematic view showing a circulation path applied to the printing apparatus according to the present disclosure in which the liquid ejection head 3 is fluidically connected to a first circulating pump 1002, a buffer tank 1003, and the like. Note that FIG. 2 only shows a path by which an ink of one color among CMYK ink flows for the sake of brevity. The buffer tank 1003 as a sub-tank to be connected to a main tank 1006 includes an air communication port (not illustrated) which communicates the inside of the tank to the outside and is capable of discharging bubbles inside the ink to the outside. The buffer tank 1003 is also connected to a replenishing pump 1005. When liquid is consumed in the liquid ejection head 3 due to the ejection (discharge) of ink from an ejection orifice of the liquid ejection head for the purpose of printing, suction recovery, or the like by ejecting ink, the replenishing pump 1005 transfers ink corresponding to a consumed amount from the main tank 1006 to the buffer tank 1003.

The first circulating pump 1002 has a role of extracting a liquid from a liquid connecting part 111 of the liquid ejection head 3 and feeding the liquid to the buffer tank 1003. A displacement pump with a quantitative liquid feeding capability is preferably used as the first circulating pump 1002. While specific examples include a tube pump, a gear pump, a diaphragm pump, a syringe pump, and the like, for example, even a form of arranging a general constant-flow valve or a relief valve at a pump outlet to secure a constant flow rate can be adopted. When the liquid ejection head 3 is being driven, the first circulating pump 1002 causes a certain amount of ink to flow inside a common collection flow path 212. A flow rate of the ink is preferably set to or above a level at which a temperature difference between respective printing element substrates 10 inside the liquid ejection head 3 does not affect printing image quality. Obviously, setting an excessively large flow rate results in excessive negative pressure between the respective printing element substrates 10 due to an effect of a pressure drop of a flow path inside a liquid ejection unit 300 and unevenness in density is created in an image. Therefore, the flow rate is preferably set while taking a temperature difference and a negative pressure difference between the respective printing element substrates 10 into consideration.

A negative pressure control unit 230 is provided between paths connecting a second circulating pump 1004 and the liquid ejection unit 300 to each other. Therefore, the negative pressure control unit 230 has a function of operating so as to maintain pressure on a downstream side of the negative pressure control unit 230 (in other words, the side of the liquid ejection unit 300) at constant pressure set in advance even when a flow rate of a circulation system fluctuates due to a difference in duties of performing printing. As two pressure adjustment mechanisms that constitute the negative pressure control unit 230, any mechanism may be used as long as the mechanism is capable of controlling pressure on a downstream side of the mechanism itself to a fluctuation within or below a certain range centered on desired set pressure. As an example, a mechanism similar to a so-called "pressure-reducing regulator" can be used. When using a pressure-reducing regulator, as shown in FIG. 2, pressure is preferably applied by the second circulating pump 1004 to an upstream side of the negative pressure control unit 230 via a liquid supply unit 220. Accordingly, since an effect of water head pressure with respect to the liquid ejection head 3 of the buffer tank 1003 can be suppressed, a degree of freedom of layout of the buffer tank 1003 in the printing apparatus 1000 can be expanded. The second circulating pump 1004 need only have pump head pressure of certain pressure or higher within a range of an ink circulation flow rate used when driving the liquid ejection head 3 and a turbo pump, a displacement pump, or the like can be used. Specifically, a diaphragm pump or the like can be applied. In addition, for example, a water head tank arranged with a certain water head difference with respect to the negative pressure control unit 230 can also be applied instead of the second circulating pump 1004.

As shown in FIG. 2, the negative pressure control unit 230 includes two pressure adjustment mechanisms respectively set to mutually different control pressures. Among the two negative pressure adjustment mechanisms, a side set to relatively high pressure (denoted by H in FIG. 2) and a side set to relatively low pressure (denoted by L in FIG. 2) are respectively connected to a common supply flow path 211 and a common collection flow path 212 in the liquid ejection unit 300 via the liquid supply unit 220. The liquid ejection unit 300 is provided with the common supply flow path 211, the common collection flow path 212, an individual supply flow path 213 and an individual collection flow path 214 which communicate with each printing element substrate. The individual supply flow path 213 and the individual collection flow path 214 are respectively communicated with the common supply flow path 211 and the common collection flow path 212. Accordingly, a part of the liquid fed by the first circulating pump 1002 passes through an internal flow path of the printing element substrate 10 from the common supply flow path 211 and flows into the common collection flow path 212 (arrow in FIG. 2). This is because a pressure difference is provided between the pressure adjustment mechanism H connected to the common supply flow path 211 and the pressure adjustment mechanism L connected to the common collection flow path 212 and the first circulating pump 1002 is only connected to the common collection flow path 212.

In this manner, in the liquid ejection unit 300, a flow of a liquid which passes inside the common collection flow path 212 and a flow from the common supply flow path 211 which passes through an internal flow path inside each printing element substrate 10 and reaches the common collection flow path 212 are created. Therefore, heat generated in each printing element substrate 10 can be discharged to the outside of the printing element substrate 10 by the flow from the common supply flow path 211 to the common collection flow path 212 while suppressing an increase in pressure loss. In addition, since the configuration described above enables, when performing printing by the liquid ejection head 3, a flow of ink to be created in an ejection orifice not involved in the printing or in a pressure chamber, thickening of ink in such parts can be suppressed. Furthermore, thickened ink and foreign objects in the ink can be discharged to the common collection flow path 212. As a result, the liquid ejection head 3 according to the present example enables high-speed and high-quality printing to be performed.

(Description of Liquid Ejection Head)

Figure 3A:
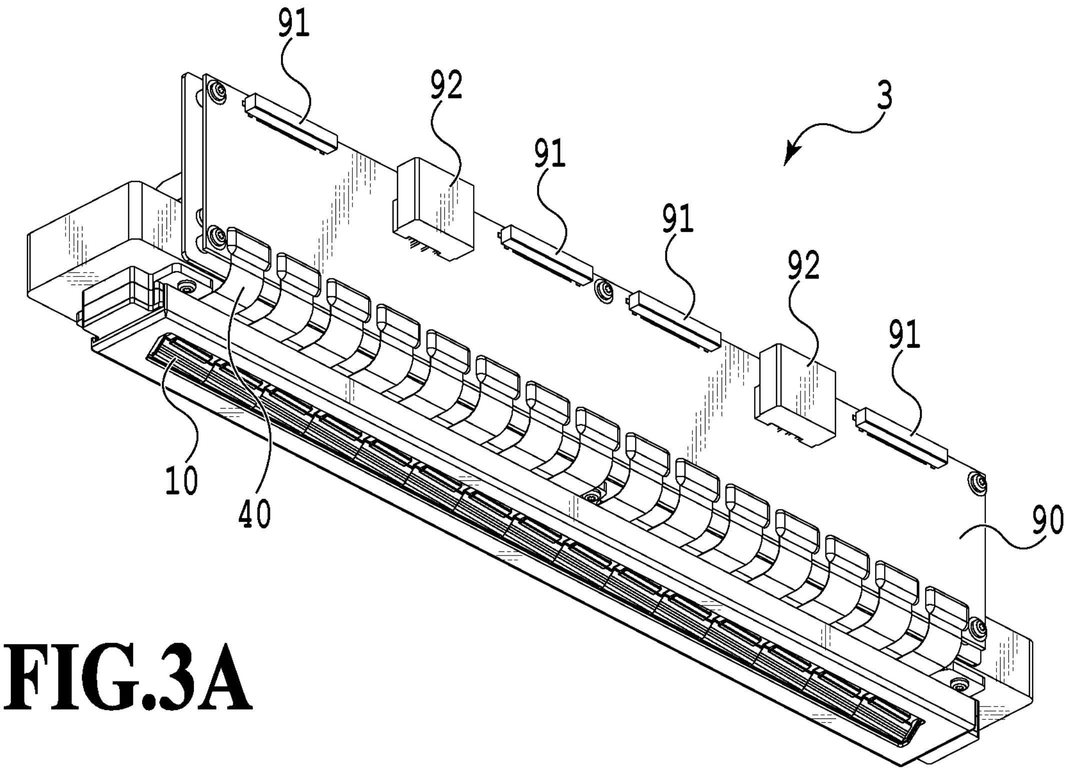
FIG. 3A and FIG. 3B are a perspective view of a liquid ejection head according to the present disclosure.
Figure 3B:
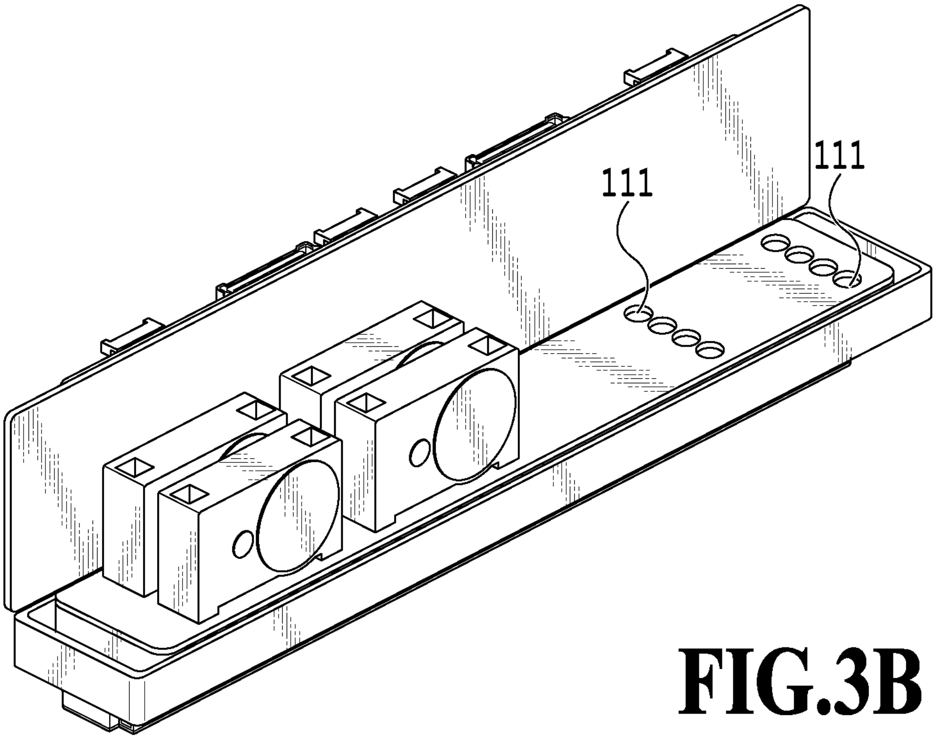

A configuration of the liquid ejection head 3 according to the present embodiment will be described. FIG. 3A and FIG. 3B are perspective views of the liquid ejection head 3 according to the present embodiment. The liquid ejection head 3 is a line liquid ejection head in which 15 printing element substrates 10, each of which being capable of single-handedly ejecting ink in a plurality of colors, are arrayed in a single line (arranged in-line). As shown in FIG. 3A, the liquid ejection head 3 includes signal input terminals 91 and power supply terminals 92 electrically connected to each printing element substrate 10 via flexible wiring substrates 40 and an electric wiring substrate 90. The signal input terminals 91 and the power supply terminals 92 are electrically connected to a control section of the printing apparatus 1000 and respectively supply the printing element substrates 10 with an ejection drive signal and power necessary for ejection. By consolidating wiring with an electric circuit inside the electric wiring substrate 90, the numbers of the signal input terminals 91 and the power supply terminals 92 can be reduced as compared to the number of printing element substrates 10. Accordingly, the number of electrically connected parts which need to be disconnected when assembling the liquid ejection head 3 with respect to the printing apparatus 1000 or when replacing the liquid ejection head can be reduced. As shown in FIG. 3B, liquid connecting parts 111 provided on one side of the liquid ejection head 3 are connected to a liquid supply system of the printing apparatus 1000. Accordingly, ink is supplied from the supply system of the printing apparatus 1000 to the liquid ejection head 3 and ink having passed through the liquid ejection head 3 is collected by the supply system of the printing apparatus 1000. In this manner, ink of each color can be circulated via a path of the printing apparatus 1000 and a path of the liquid ejection head 3.

Figure 4:
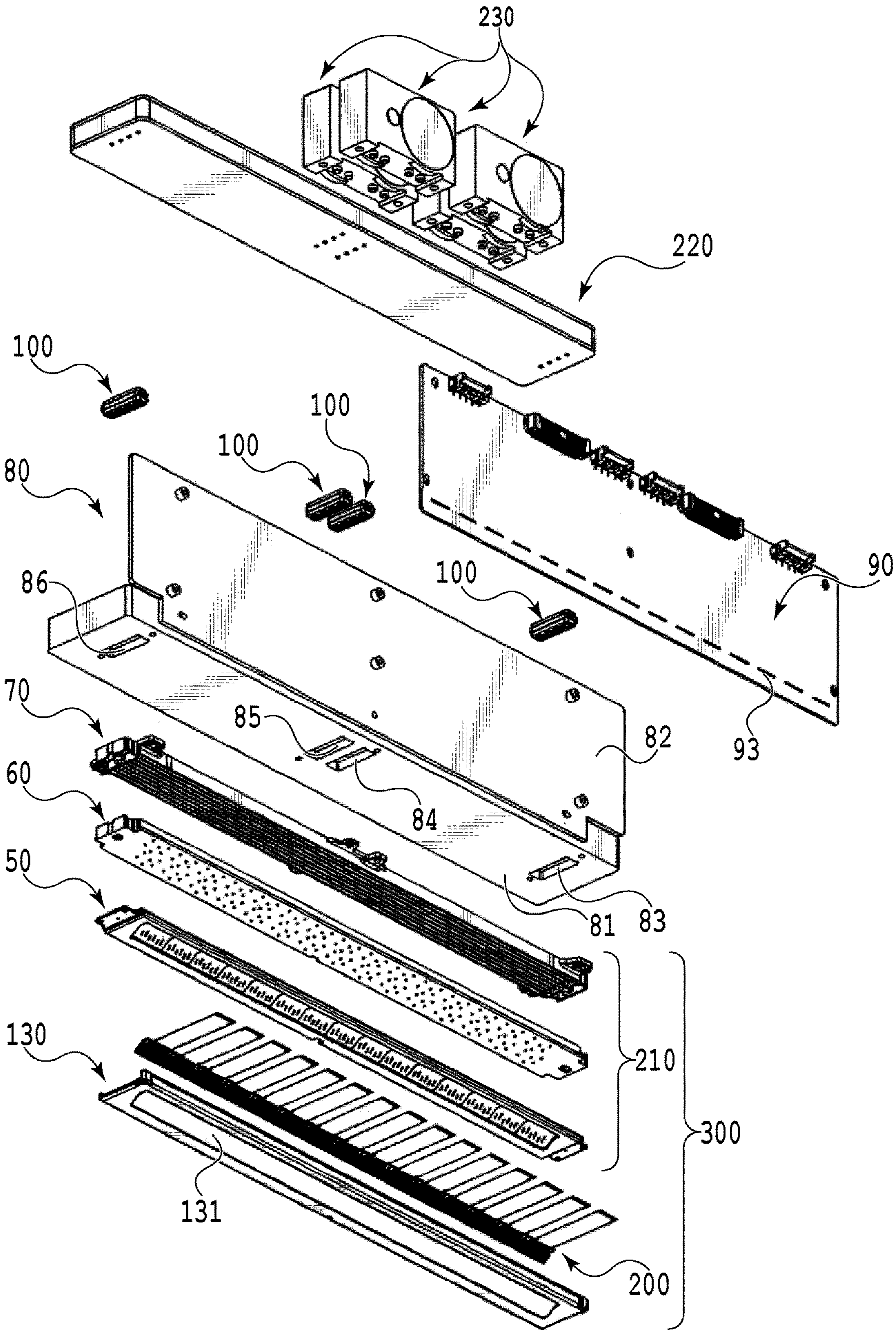
FIG. 4 is an exploded perspective view of the liquid ejection head according to the present disclosure.

Next, a configuration of the liquid ejection head 3 will be specifically described with reference to FIG. 4. FIG. 4 shows an exploded perspective view of each component or unit which constitutes the liquid ejection head 3. The liquid ejection unit 300, the liquid supply unit 220, and the electric wiring substrate 90 are mounted to a case 80. The liquid supply unit 220 is provided with the liquid connecting parts 111 (refer to FIG. 3A and FIG. 3B) and internally provided with a separate filter 221 (refer to FIG. 2) for each color which communicates with each opening of the liquid connecting parts 111 in order to remove foreign objects in supplied ink. The liquid supply unit 220 is provided with filters 221 for four colors. A liquid having passed through the filters 221 is supplied to the negative pressure control unit 230 arranged on the liquid supply unit 220 so as to correspond to each color. The negative pressure control unit 230 is a unit made up of a separate pressure-regulating valve for each color. Due to actions of valves, spring members, and the like respectively provided inside the negative pressure control unit 230, the negative pressure control unit 230 significantly attenuates a change in pressure drop inside a supply system of the printing apparatus 1000 (an upstream-side supply system of the liquid ejection head 3) which occurs with a fluctuation in a flow rate of the liquid. Accordingly, the negative pressure control unit 230 can stabilize a change in negative pressure on a downstream side of the pressure control unit (on a side of the liquid ejection unit 300) within a certain range. As shown in FIG. 2, two pressure-regulating valves for each color are built into the negative pressure control unit 230 of each color and the pressure-regulating valves are respectively set to different control pressures. In addition, a high pressure side of the negative pressure control unit 230 is communicated with the common supply flow path 211 inside the liquid ejection unit 300 and a low pressure side of the negative pressure control unit 230 is communicated with the common collection flow path 212 inside the liquid ejection unit 300, respectively, via the liquid supply unit 220.

The case 80 which is constituted of a liquid ejection unit support portion 81 and an electric wiring substrate support portion 82 supports the liquid ejection unit 300 and the electric wiring substrate 90 and secures stiffness of the liquid ejection head 3. The electric wiring substrate support portion 82 is for supporting the electric wiring substrate 90 and is fixed to the liquid ejection unit support portion 81 by screwing. The liquid ejection unit support portion 81 has a role of correcting warpage or deformation of the liquid ejection unit 300 and securing accuracy of relative positions of the plurality of printing element substrates 10 and, accordingly, suppresses streaks or unevenness in a printed subject. Therefore, the liquid ejection unit support portion 81 preferably has sufficient stiffness and suitable materials include a metal material such as SUS or aluminum or a ceramic such as alumina. The liquid ejection unit support portion 81 is provided with openings 83, 84, 85, and 86 into which a joint rubber 100 is to be inserted. A liquid supplied from the liquid supply unit 220 is guided via the joint rubber to a flow path member 210 which constitutes the liquid ejection unit 300.

The liquid ejection unit 300 is made up of a plurality of the ejection modules 200 and the flow path member 210 and a cover member 130 is mounted to a printed medium-side surface of the liquid ejection unit 300. In this case, as shown in FIG. 4, the cover member 130 is a member having a frame-like surface provided with an elongated opening 131 and the printing element substrate 10 and a sealed section 110 (FIG. 8A and FIG. 8B) included in the ejection module 200 are exposed from the opening 131. A frame section in a periphery of the opening 131 has a feature as an abutting surface of a cap member which caps the liquid ejection head 3 during print stand-by. Therefore, a closed space is preferably formed when the liquid ejection head 3 is capped by applying an adhesive, a sealing material, a filler, or the like along the periphery of the opening 131 to fill concavities and convexities or gaps on an ejection orifice surface of the liquid ejection unit 300.

Next, a configuration of the flow path member 210 included in the liquid ejection unit 300 will be described. As shown in FIG. 4, the flow path member 210 is a laminate of a first flow path member 50, a second flow path member 60, and a third flow path member 70. In addition, the flow path member 210 is a flow path member for distributing the liquid supplied from the liquid supply unit 220 to each ejection module 200 and for returning the liquid that flows back from the ejection module 200 to the liquid supply unit 220. The flow path member 210 is fixed to the liquid ejection unit support portion 81 by screwing and, accordingly, warpage and deformation of the flow path member 210 are suppressed.

Figure 5A:
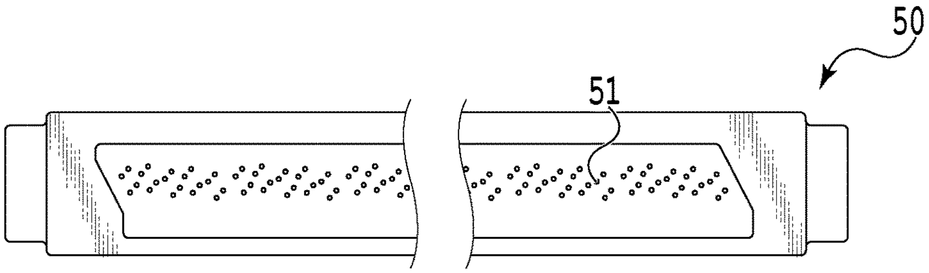
FIG. 5A to FIG. 5F are diagrams showing a front surface and a rear surface of each flow path member of the liquid ejection head according to the present disclosure.
Figure 5B:
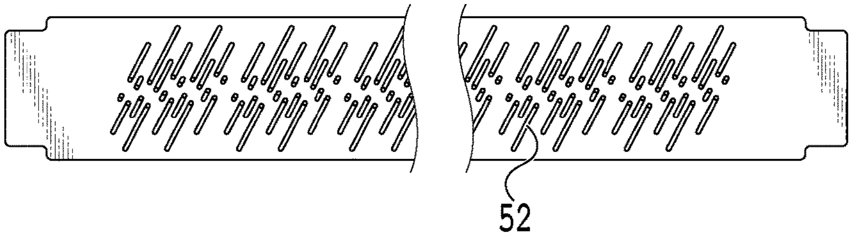
Figure 5C:
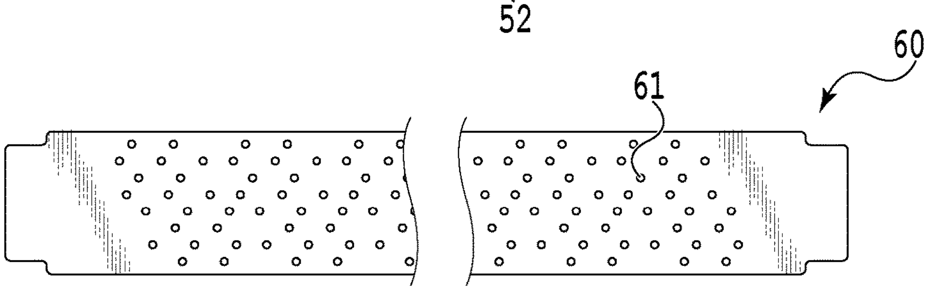
Figure 5D:
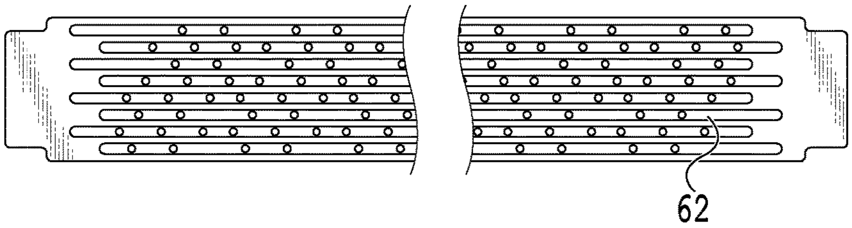
Figure 5E:
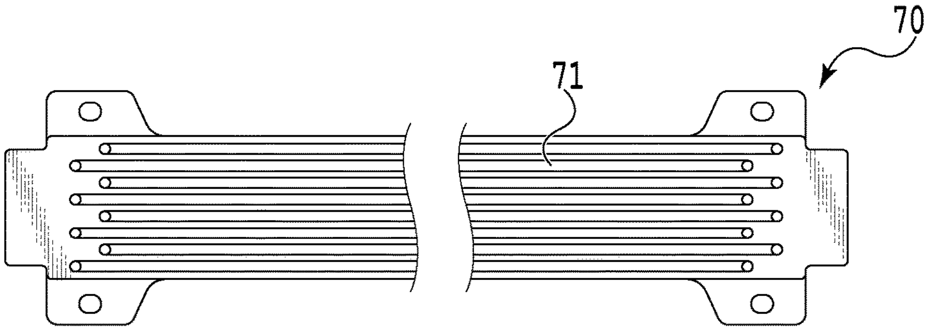
Figure 5F:
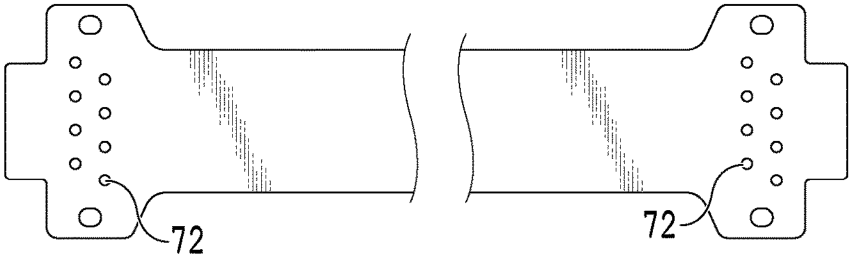

FIG. 5A to FIG. 5F are diagrams showing a front surface and a rear surface of each of the first to third flow path members. FIG. 5A shows a surface on a side on which the ejection module 200 is mounted of the first flow path member 50 and FIG. 5F shows a surface which abuts the liquid ejection unit support portion 81 of the third flow path member 70. The first flow path member 50 and the second flow path member 60 are joined so that FIG. 5B and FIG. 5C representing abutting surfaces of the respective flow path members oppose each other, and the second flow path member 60 and the third flow path member 70 are joined so that FIG. 5D and FIG. 5E representing abutting surfaces of the respective flow path members oppose each other. By joining the second flow path member 60 and the third flow path member 70, eight common flow paths which extend in a longitudinal direction of the flow path members are formed by a common flow path groove 62 and a common flow path groove 71 formed in each flow path member. Accordingly, for each color of the liquid, a set of the common supply flow path 211 and the common collection flow path 212 are formed inside the flow path member 210 (refer to FIG. 6). A communication port 72 of the third flow path member 70 is communicated with each hole of the joint rubber 100 and fluidically communicated with the liquid supply unit 220. Communication ports 61 are formed in plurality on a bottom surface of the common flow path groove 62 of the second flow path member 60 and are communicated with one end section of an individual flow path groove 52 of the first flow path member 50. A communication port 51 is formed in another end section of the individual flow path groove 52 of the first flow path member 50 and is fluidically communicated with the plurality of ejection modules 200 via the communication port 51. The individual flow path groove 52 enables flow paths to be consolidated on a center side of the flow path members.

The first to third flow path members are preferably made of a material with corrosion resistance against liquids and with a low coefficient of linear expansion. As a base material of the flow path members, for example, alumina, LCP (liquid crystal polymer), PPS (polyphenyl sulfide), PSF (polysulfone), or modified PPE (polyphenylene ether) can be suitably used. In addition, as a material of the flow path members, a composite material (resin material) created by adding an inorganic filler such as silica fine particles or fibers to the base material of the flow path members can be suitably used. As a formation method of the flow path member 210, the three flow path members may be laminated and glued to each other or, when a composite resin material is selected as the material, a joining method by welding may be used.

Figure 6:
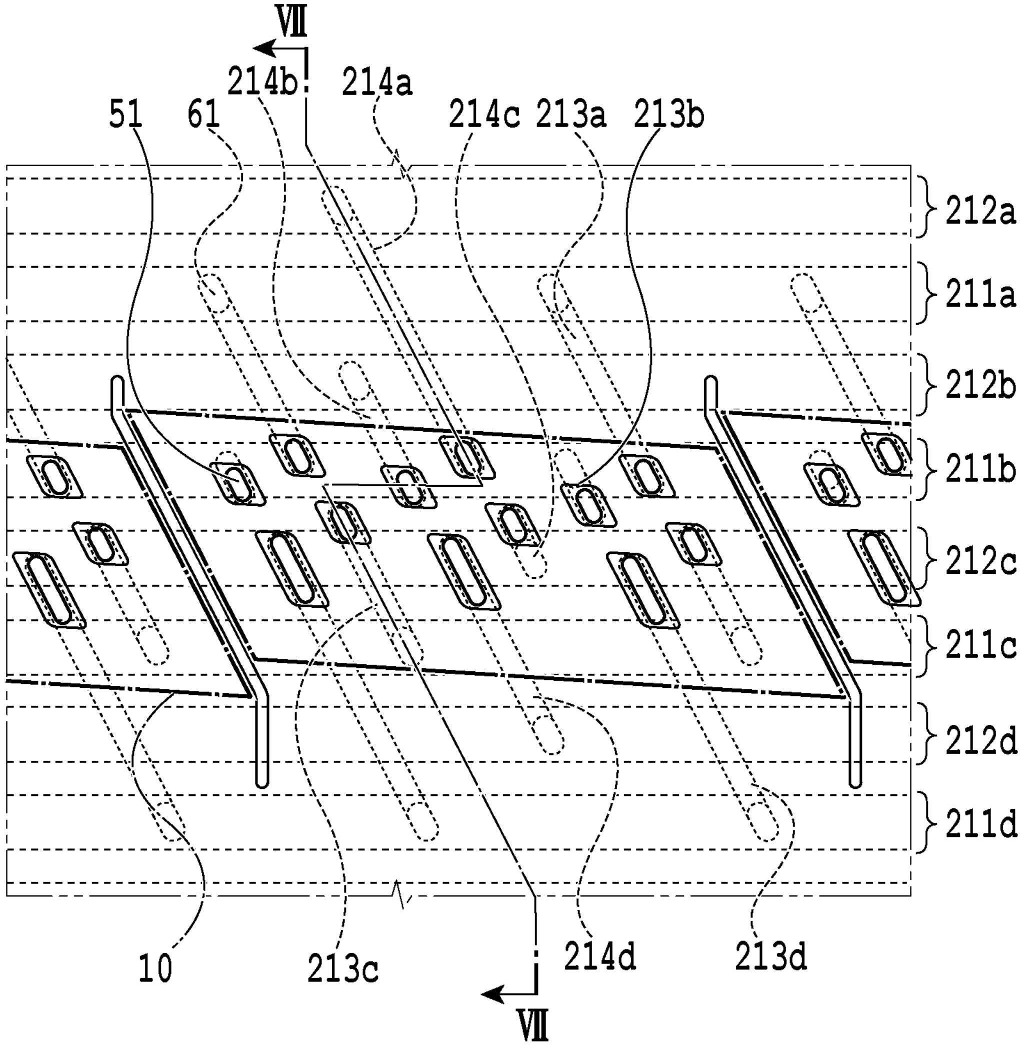
FIG. 6 is a partial enlarged perspective view of a flow path inside a flow path member of the liquid ejection head according to the present disclosure as viewed from a side of an ejection module.

Next, a connection relationship of the respective flow paths in the flow path member 210 will be described using FIG. 6. FIG. 6 is a perspective view of an enlargement of a part of flow paths inside the flow path member 210 which is formed by joining the first to third flow path members as viewed from the surface on which the ejection module 200 is mounted of the first flow path member 50. Common supply flow paths 211 (211*a*, 211*b*, 211*c*, and 211*d*) and common collection flow paths 212 (212*a*, 212*b*, 212*c*, and 212*d*) which extend in a longitudinal direction of the liquid ejection head 3 for each color are provided in the flow path member 210. A plurality of individual supply flow paths 213 (213*a*, 213*b*, 213*c*, and 213*d*) formed by the individual flow path groove 52 are connected via the communication port 61 to the common supply flow path 211 of each color. In addition, a plurality of individual collection flow paths 214 (214*a*, 214*b*, 214*c*, and 214*d*) formed by the individual flow path groove 52 are connected via the communication port 61 to the common collection flow path 212 of each color. Such a flow path configuration enables ink to be consolidated to the printing element substrate 10 positioned in a center section of the flow path members from each common supply flow path 211 via the individual supply flow paths 213. Furthermore, ink can be collected to each common collection flow path 212 from the printing element substrates 10 via the individual collection flow paths 214.

Figure 7:
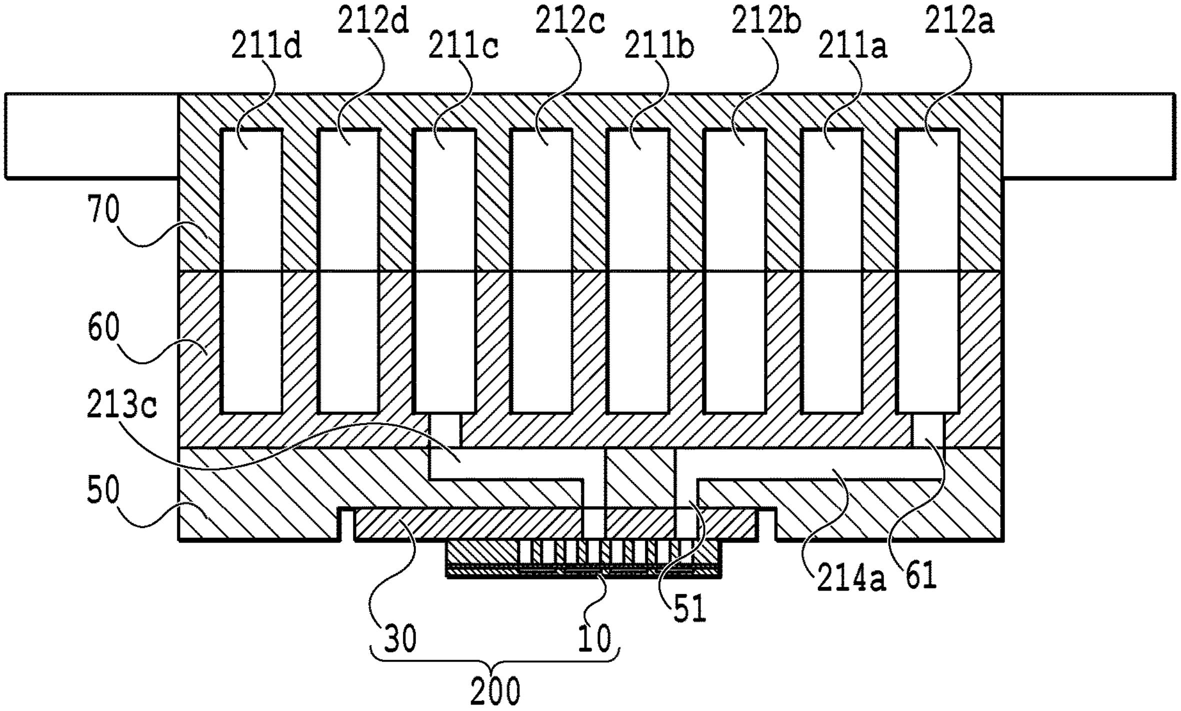
FIG. 7 is a sectional view taken along a line VII-VII in FIG. 6.

FIG. 7 is a diagram showing a cross section taken along a line VII-VII in FIG. 6. As shown in the diagram, the individual supply flow path 213*c* and the individual collection flow path 214*a* are respectively communicated with the ejection module 200 via the communication port 51. Only the individual supply flow path 213*c* and the individual collection flow path 214*a* are illustrated in FIG. 7. On the other hand, on other cross sections, other individual supply flow paths (213*a*, 213*b*, and 213*d*) and other individual collection flow paths (214*b*, 214*c*, and 214*d*) are respectively communicated with the ejection module 200 as shown in FIG. 6. A flow path for supplying ink from the first flow path member 50 to a printing element 15 (refer to FIG. 9) provided in the printing element substrate 10 is formed in a support member 30 and the printing element substrate 10 included in each ejection module 200. In addition, a flow path for collecting (returning) a part of or all of the liquid supplied to the printing element 15 to the first flow path member 50 is formed in the support member 30 and the printing element substrate 10 included in each ejection module 200. In this case, the common supply flow path 211 of each color is connected via the liquid supply unit 220 to the negative pressure control unit 230 (high pressure side) of a corresponding color, and the common collection flow path 212 is connected via the liquid supply unit 220 to the negative pressure control unit 230 (low pressure side). The negative pressure control unit 230 is configured to create differential pressure (pressure difference) between the common supply flow path 211 and the common collection flow path 212. Therefore, in the liquid ejection head according to the present embodiment to which each flow path is connected as shown in FIG. 6 and FIG. 7, a flow in the order of the common supply flow path 211, the individual supply flow path 213, the printing element substrate 10, the individual collection flow path 214, and the common collection flow path 212 is generated for each color.

(Description of Ejection Module)

Figure 8A:
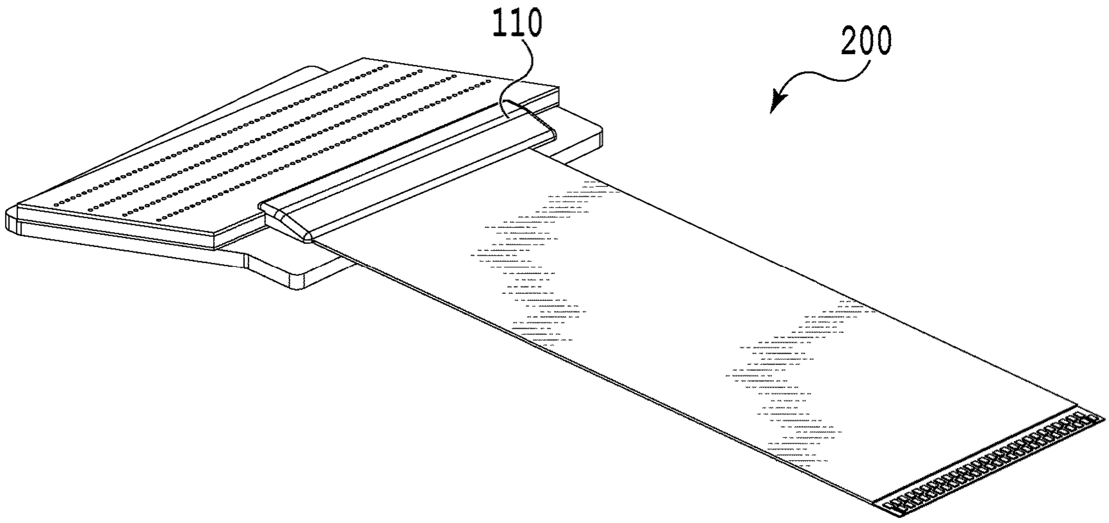
FIG. 8A and FIG. 8B are a perspective view and an exploded view of a single ejection module of the liquid ejection head according to the present disclosure.
Figure 8B:
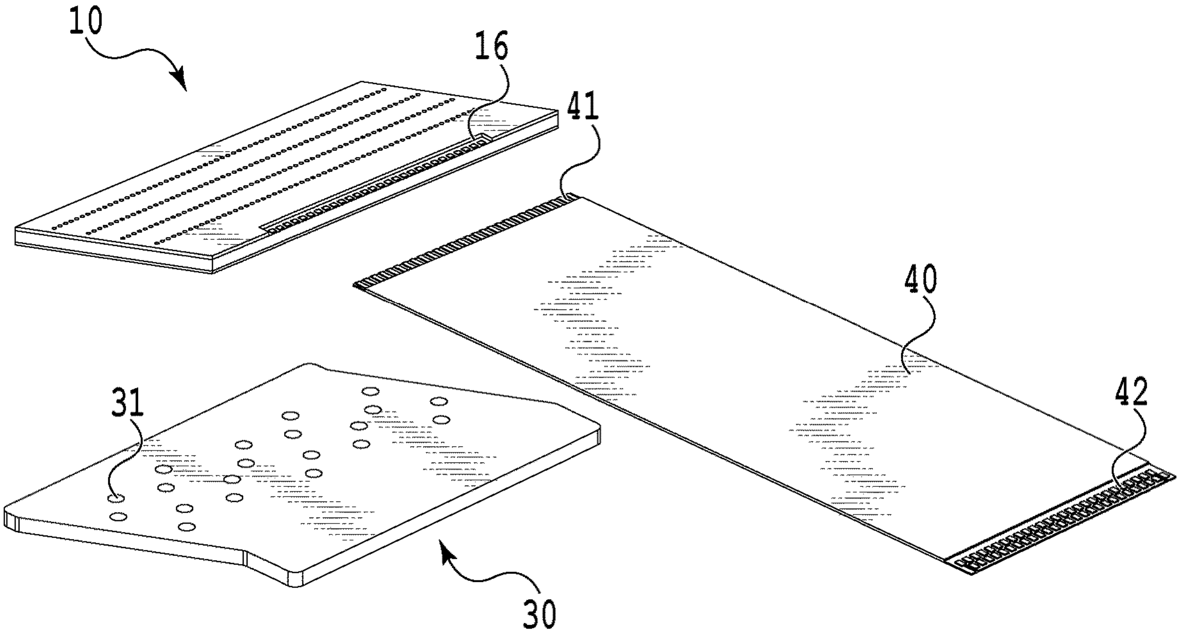

FIG. 8A shows a perspective view of a single ejection module 200 and FIG. 8B shows an exploded view of the ejection module 200. As a method of manufacturing the ejection module 200, first, the printing element substrate 10 and the flexible wiring substrate 40 are bonded onto the support member 30 having been provided with a liquid communication port 31 in advance. Subsequently, a terminal 16 on the printing element substrate 10 and a terminal 41 on the flexible wiring substrate 40 are electrically connected by wire bonding and, subsequently, the wire-bonded section (electrically-connected section) is covered by a sealing material to form the sealed section 110. A terminal 42 on an opposite side to the printing element substrate 10 of the flexible wiring substrate 40 is electrically connected to a connecting terminal 93 (refer to FIG. 4) of the electric wiring substrate 90. Since the support member 30 is a support which supports the printing element substrate 10 and also a flow path member which fluidically communicates the printing element substrate 10 and the flow path member 210 with each other, preferably, the support member 30 has high flatness and can be joined to the printing element substrate with sufficiently high reliability. For example, alumina or a resin material is preferable as a material of the support member 30.

(Description of Printing Element Substrate)

Figure 9A:
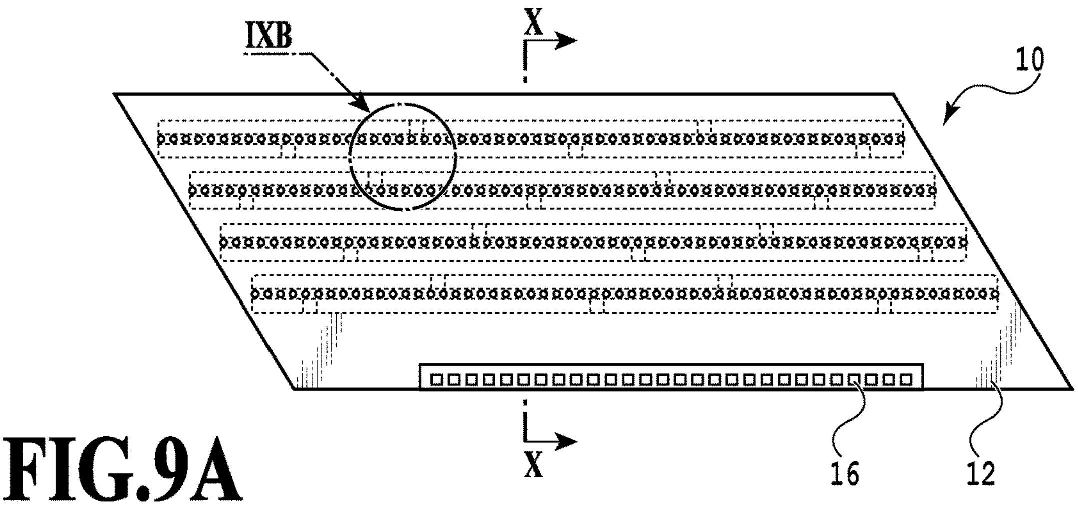
FIG. 9A to FIG. 9C are a plan view and an enlarged view of a side of an ejection orifice surface of a printing element substrate of the liquid ejection head according to the present disclosure.
Figure 9B:
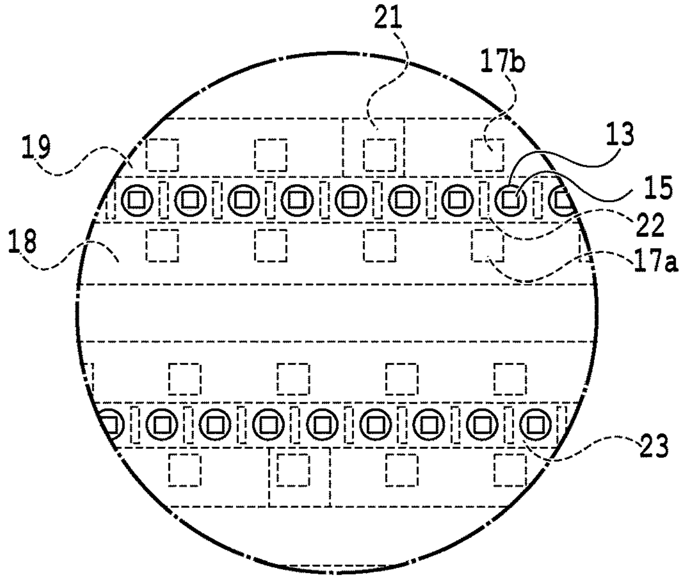
Figure 9C:
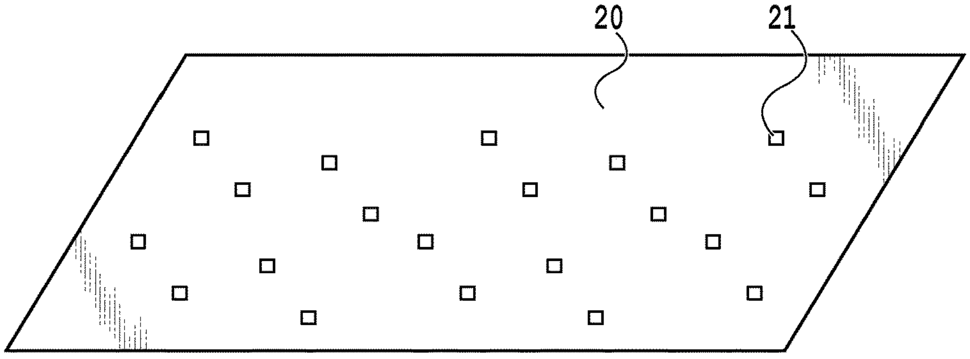

A configuration of the printing element substrate 10 according to the present embodiment will be described. FIG. 9A shows a plan view of a surface on the side where ejection orifices 13 are formed of the printing element substrate 10, FIG. 9B shows an enlarged view of a portion indicated by IXB in FIG. 9A, and FIG. 9C shows a plan view of a rear surface of the printing element substrate 10 in FIG. 9A. As shown in FIG. 9A, four ejection orifice arrays, each of which corresponds to one ink color, are formed on an ejection orifice forming member 12 of the printing element substrate 10. Hereinafter, a direction in which an ejection orifice array being an array of a plurality of ejection orifices 13 extends will be referred to as an "ejection orifice array direction".

As shown in FIG. 9B, the printing element 15 which is a heating element for generating bubbles from a liquid using thermal energy is arranged at a position corresponding to one ejection orifice 13. A pressure chamber 23 which internally includes the printing elements 15 is sectioned by partitions 22. The printing elements 15 are electrically connected to the terminal 16 shown in FIG. 9A by electric wiring (not illustrated) provided on the printing element substrate 10. In addition, the printing elements 15 generate heat based on a pulse signal inputted via the electric wiring substrate 90 (FIG. 4) and the flexible wiring substrate 40 (FIG. 8B) from a control circuit of the printing apparatus 1000 and causes the liquid to boil. The liquid is ejected from the ejection orifices 13 by a bubbling force created by the boiling. As shown in FIG. 9B, along each ejection orifice array, a liquid supply path 18 extends on one side and a liquid collection path 19 extends on another side. The liquid supply path 18 and the liquid collection path 19 are flow paths provided on the printing element substrate 10 and extending in the ejection orifice array direction and are respectively communicated with the ejection orifices 13 via supply ports 17*a* and collection ports 17*b*.

Figure 10:
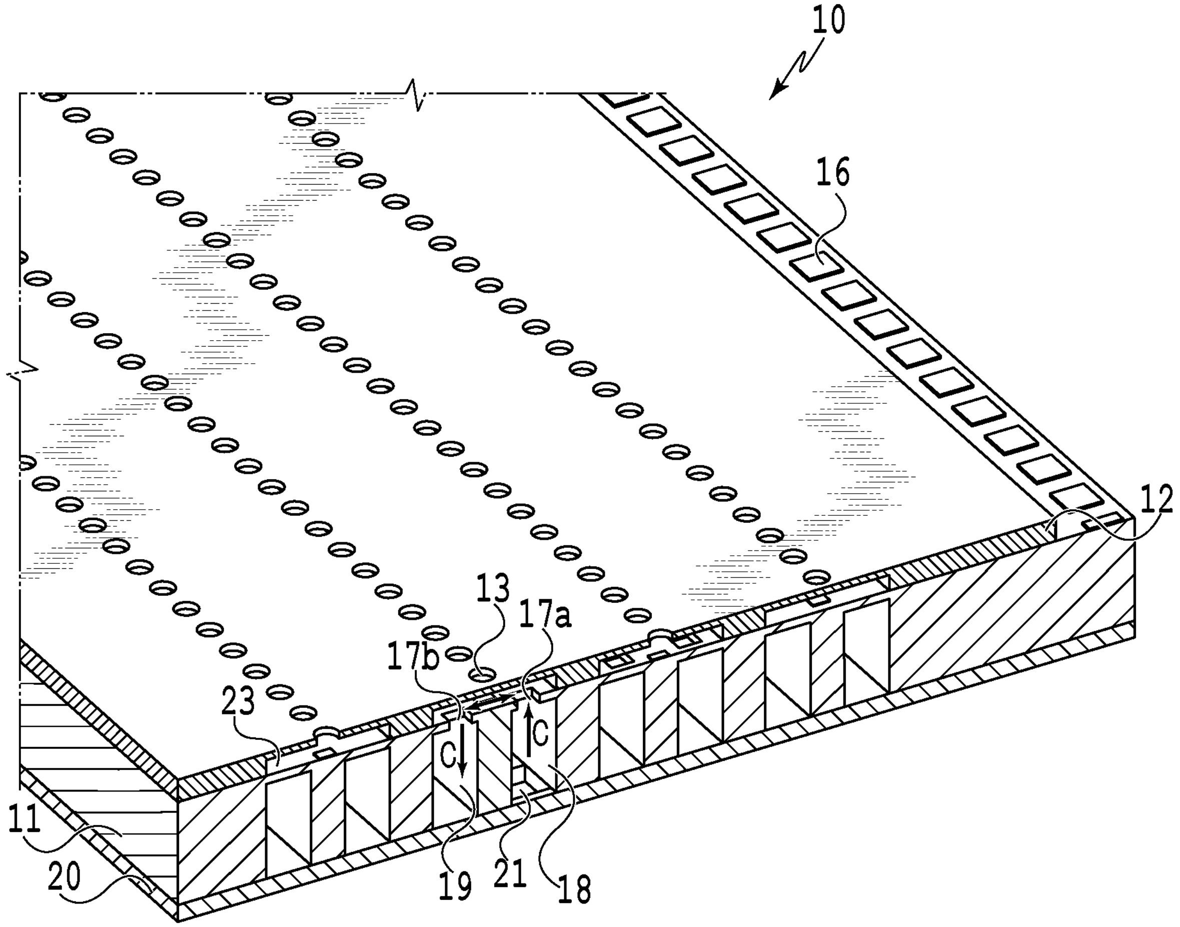
FIG. 10 is a sectional perspective view of taken along a line X-X in FIG. 9A.

FIG. 10 is a perspective view showing cross sections of the printing element substrate 10 and a lid member 20 taken along a line X-X in FIG. 9A. As shown in FIG. 9C and FIG. 10, a sheet-like lid member 20 is laminated on a rear surface of the surface on which the ejection orifices 13 are formed of the printing element substrate 10 and the lid member 20 is provided with a plurality of openings 21 which communicate with the liquid supply path 18 and the liquid collection path 19 (to be described later). For example, in the present embodiment, the lid member 20 is provided with three openings 21 with respect to one liquid supply path 18 and two openings 21 with respect to one liquid collection path 19. As shown in FIG. 9B, each opening 21 of the lid member 20 is communicated with the plurality of communication ports 51 shown in FIG. 5A. As shown in FIG. 10, the lid member 20 has a function as a lid which forms a part of a wall of the liquid supply path 18 and the liquid collection path 19 formed on a substrate 11 of the printing element substrate 10. The lid member 20 preferably has sufficient corrosion resistance with respect to liquids and, in addition, from the perspective of preventing mixing of colors, high accuracy is required of an opening shape and an opening position of the openings 21. Therefore, preferably, a photosensitive resin material or a silicon plate is used as a material of the lid member 20 and the openings 21 are provided by a photolithography process. In this manner, the lid member 20 changes a pitch of flow paths using the openings 21 and, when pressure loss is taken into consideration, the lid member 20 is desirably thin and constituted of a film-like member.

Next, a flow of a liquid inside the printing element substrate 10 will be described. The substrate 11 formed of silicon and the ejection orifice forming member 12 formed of a photosensitive resin are laminated to construct the printing element substrate 10 and the lid member 20 is joined to the rear surface of the substrate 11. The printing element 15 (refer to FIG. 9B) is formed on a side of one surface of the substrate 11 and a groove which constitutes the liquid supply path 18 and the liquid collection path 19 extending along the ejection orifice arrays is formed on a side of a rear surface of the substrate 11. The liquid supply path 18 and the liquid collection path 19 formed by the substrate 11 and the lid member 20 are respectively connected to the common supply flow path 211 and the common collection flow path 212 in the flow path member 210 and differential pressure is created between the liquid supply path 18 and the liquid collection path 19. When a liquid is being ejected from the plurality of ejection orifices 13 of the liquid ejection head 3 and printing is being performed, differential pressure is created at an ejection orifice not performing an ejection operation. Due to the differential pressure, a liquid inside the liquid supply path 18 provided in the substrate 11 flows to the liquid collection path 19 via the supply port 17*a*, the pressure chamber 23, and the collection port 17*b* (a flow indicated by an arrow C in FIG. 10). Due to the flow, thickened ink created by evaporation from the ejection orifices 13, bubbles, foreign objects, and the like in the ejection orifice 13 not engaged in printing or in the pressure chamber 23 can be collected to the liquid collection path 19. In addition, thickening of ink in the ejection orifices 13 and the pressure chamber 23 can be suppressed. The liquid collected to the liquid collection path 19 passes through the openings 21 and the liquid communication port 31 (refer to FIG. 8B), collected in an order of the communication port 51 inside the flow path member 210, the individual collection flow path 214, and the common collection flow path 212, and finally collected to the supply flow path of the printing apparatus 1000.

In other words, a liquid supplied from the printing apparatus main body to the liquid ejection head 3 is circulated, supplied, and collected in the following order. In the circulation path shown in FIG. 2, the liquid first flows into the liquid ejection head 3 from the liquid connecting part 111 of the liquid supply unit 220 and, after flowing through the negative pressure control unit 230, the liquid is supplied to the joint rubber 100. The liquid is then supplied in the order of the communication port 72 and the common flow path groove 71 provided in the third flow path member, the common flow path groove 62 and the communication port 61 provided in the second flow path member, and the individual flow path groove 52 and the communication port 51 provided in the first flow path member. Subsequently, the liquid is supplied to the pressure chamber 32 sequentially via the liquid communication port 31 provided in the support member 30, the openings 21 provided in the lid member 20, and the liquid supply path 18 and the supply port 17*a* provided in the substrate 11. Among the liquid supplied to the pressure chamber 23, the liquid not ejected from the ejection orifices 13 flows in an order of the collection port 17*b* and the liquid collection path 19 provided in the substrate 11, the openings 21 provided in the lid member 20, and the liquid communication port 31 provided in the support member 30. Subsequently, the liquid flows in the order of the communication port 51 and the individual flow path groove 52 provided in the first flow path member, the communication port 61 and the common flow path groove 62 provided in the second flow path member, the common flow path groove 71 and the communication port 72 provided in the third flow path member 70, and the joint rubber 100. In addition, the liquid flows to the outside of the liquid ejection head 3 from the liquid connecting part 111 provided in the liquid supply unit 220. In this manner, in the liquid ejection head of the present embodiment, since thickening of a liquid in the pressure chamber or in a vicinity of ejection orifices can be suppressed, a position error of ejection and ink non-discharge can be suppressed and, consequently, printing with high image quality can be performed.

While a material of the ejection orifice forming member in the present embodiment is a photosensitive resin, the present disclosure is not limited thereto and a configuration of the present disclosure can be preferably applied even when using silicon, a metal, a ceramic, glass, or other materials, for example.

(Description of Positional Relationship Between Printing Element Substrates)

Figure 11:
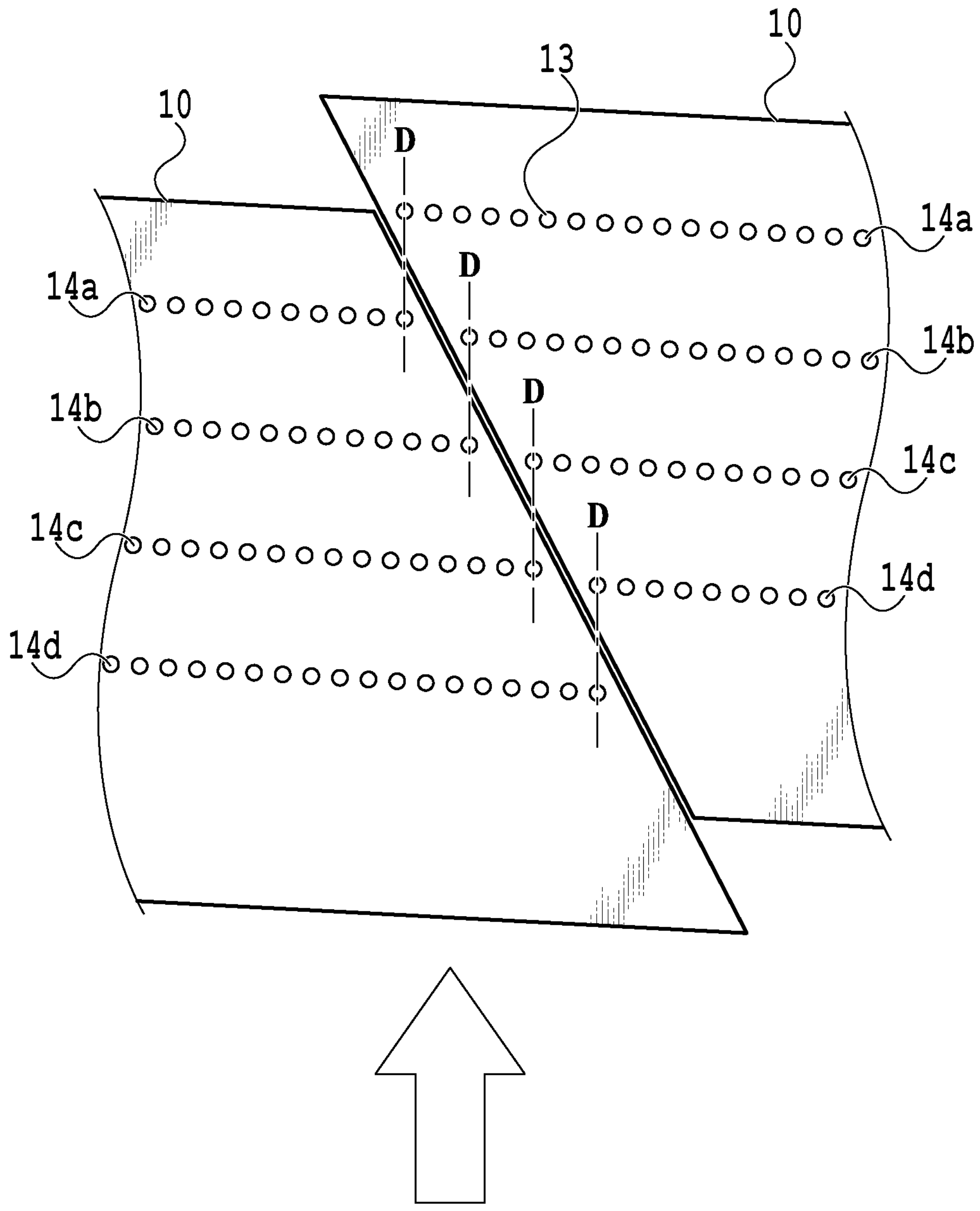
FIG. 11 is a partial enlarged view of adjacent printing element substrates of the liquid ejection head according to the present disclosure.

FIG. 11 is a plan view showing, partially enlarged, an adjacent portion of printing element substrates in two adjacent ejection modules. As shown in FIG. 9A, printing element substrates with an approximately parallelogram shape are used in the present embodiment. As shown in FIG. 11, each of the ejection orifice arrays (14*a* to 14*d*) in which ejection orifices 13 are arrayed in each printing element substrate 10 is arranged so as to be inclined by a certain angle with respect to the conveying direction of the printed medium. Accordingly, the ejection orifice arrays in an adjacent portion of printing element substrates 10 are configured so that at least one ejection orifice overlaps in the conveying direction of the printed medium. In FIG. 11, two ejection orifices on a line D are in an overlapping relationship with each other. Even when a position of the printing element substrate 10 deviates from a predetermined position to a certain extent, such an arrangement enables black stripes or blank areas in a printed image to be made less conspicuous due to drive control of the overlapping ejection orifices. The plurality of printing element substrates 10 may be arranged on a straight line (in-line) instead of a staggered arrangement. Even when arranged on a straight line, a configuration such as that shown in FIG. 11 enables measures against black stripes or blank areas in an overlap portion of printing element substrates 10 to be taken while preventing a length of the liquid ejection head 3 in a conveying direction (a direction of an arrow in FIG. 11) of a printed medium from increasing. While a main face of the printing element substrates is a parallelogram in the present embodiment, the present disclosure is not limited thereto and a configuration of the present disclosure can be preferably applied even when using printing element substrates that are a rectangle, a trapezoid, or another shape, for example.

DESCRIPTION OF EMBODIMENTS OF THE PRESENT DISCLOSURE

First Embodiment

A first embodiment of the present disclosure will be described. Descriptions of functions and components similar to the basic configuration of the present disclosure will be omitted and different points will be described.

Figure 12A:
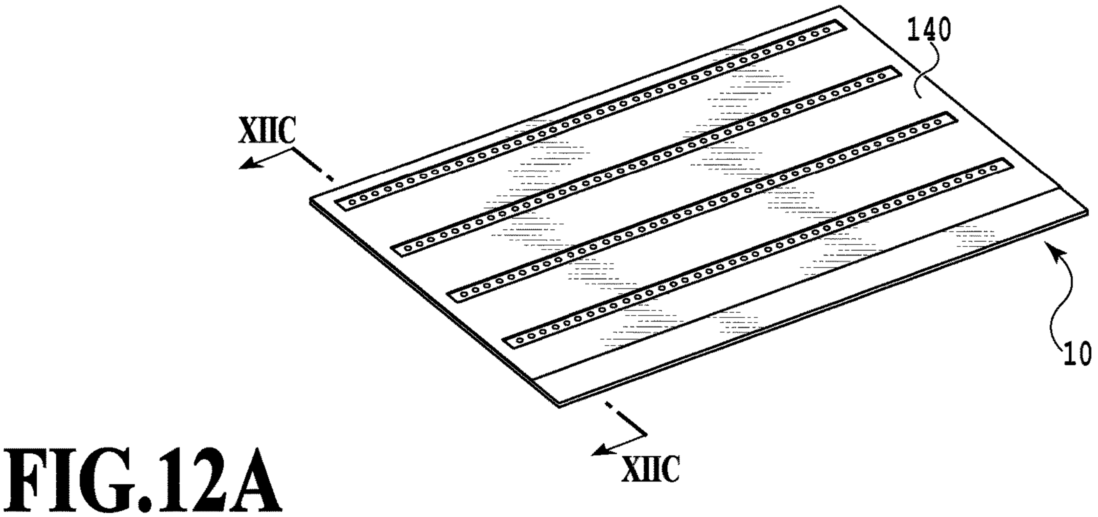
FIG. 12A to FIG. 12C are a perspective view, an exploded perspective view, and a sectional view of an ejection module of a liquid ejection head according to a first embodiment.
Figure 12B:
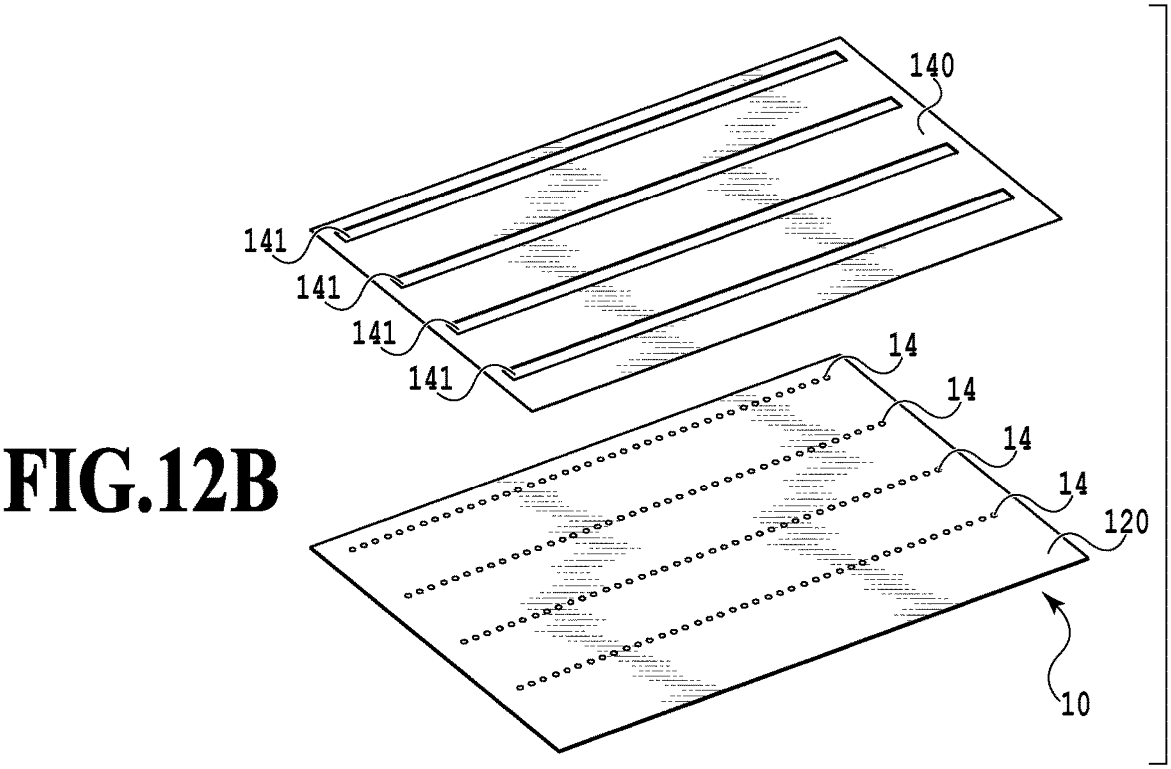
Figure 12C:
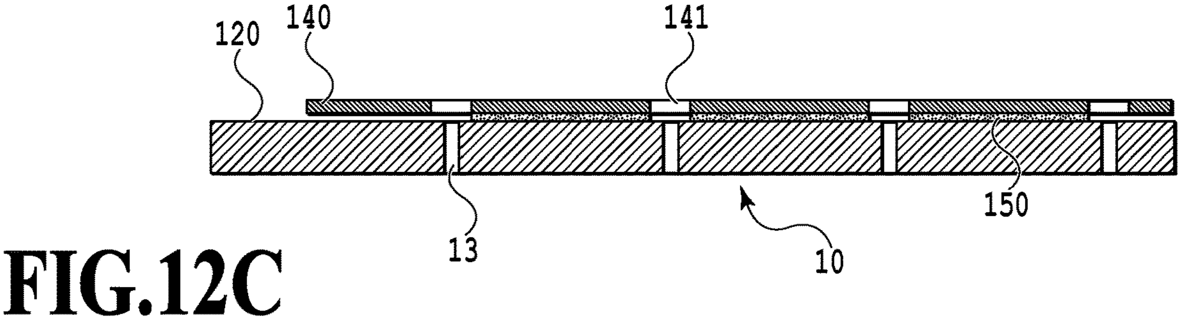
Figure 13A:
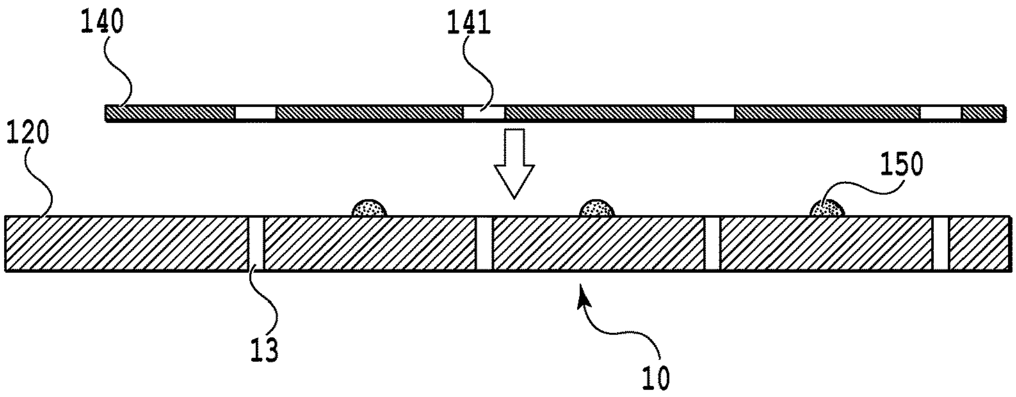
FIG. 13A to FIG. 13C are schematic views showing an adhesive-applied state in FIG. 12C.
Figure 13B:
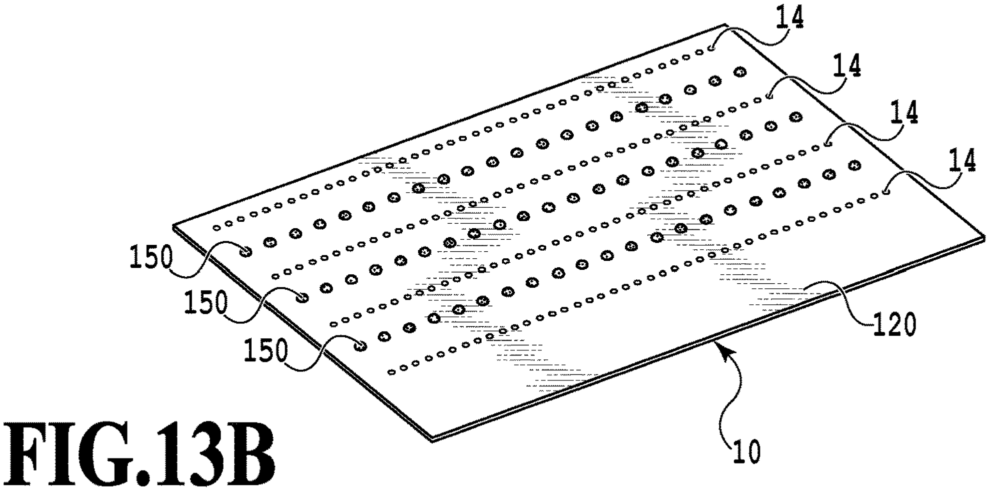
Figure 13C:
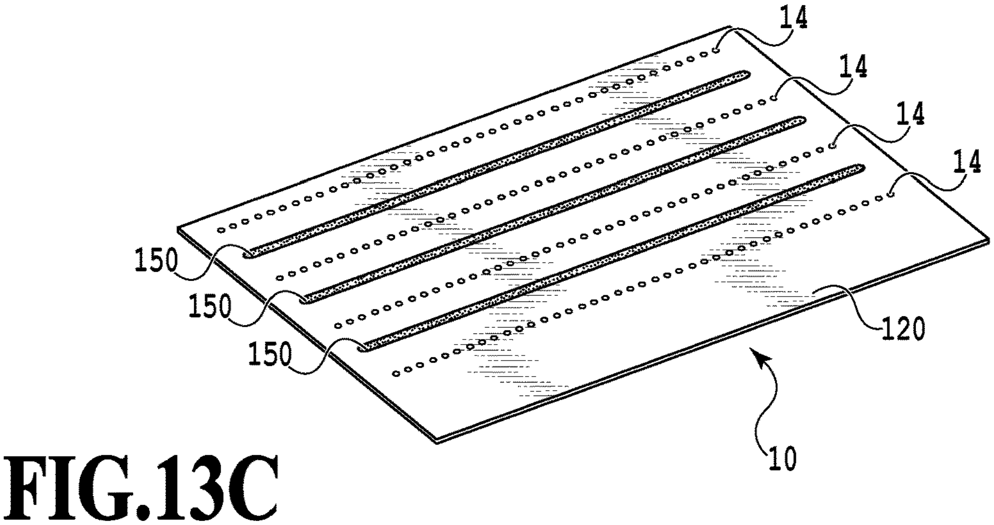
Figure 14A:
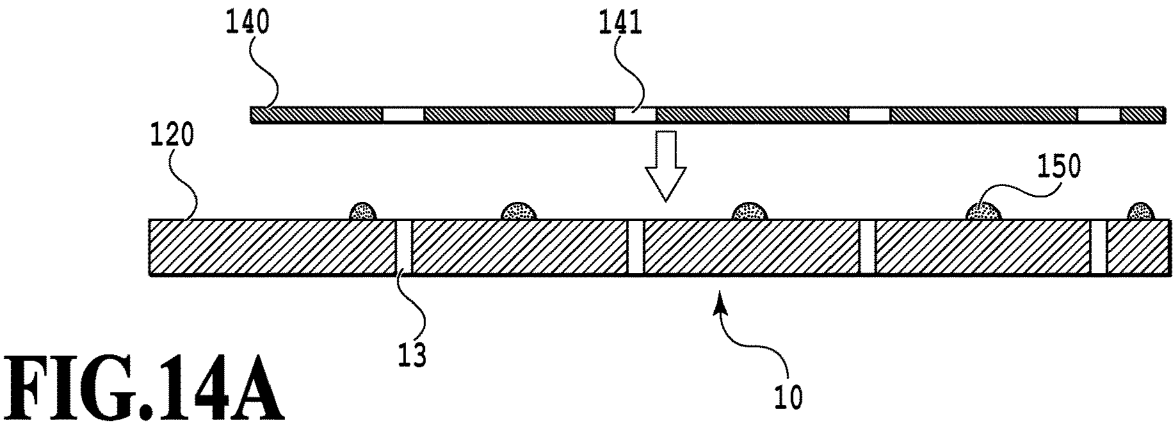
FIG. 14A to FIG. 14C are schematic views showing an example of an adhesive-applied state in an ejection module of the liquid ejection head according to the first embodiment.
Figure 14B:
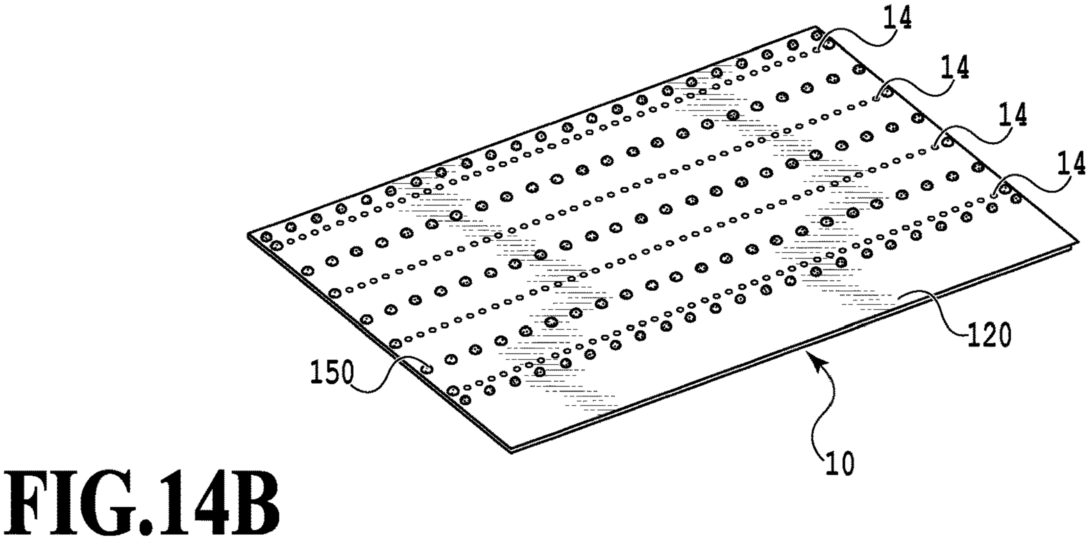
Figure 14C:
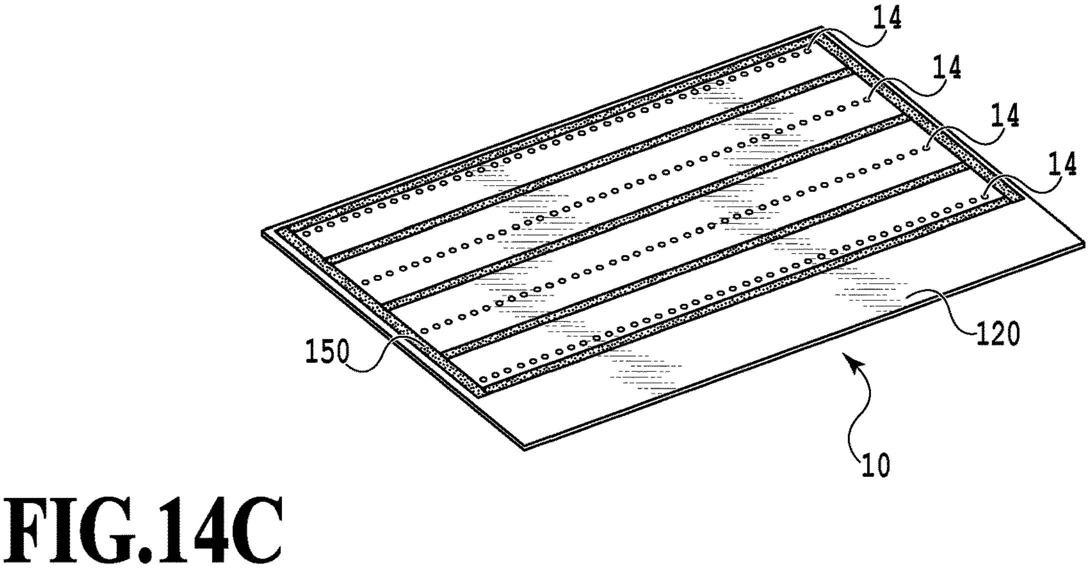

FIG. 12A is a perspective view of a simplified ejection module in the first embodiment. FIG. 12B is an exploded perspective view of FIG. 12A. FIG. 12C is a sectional view taken along a line XIIC-XIIC in FIG. 12A. FIG. 13A is a schematic view showing an adhesive-applied state in FIG. 12C. FIG. 13B and FIG. 13C are schematic views showing an example of an adhesive-applied position in FIG. 13A. FIG. 14A is a schematic view showing an example of the adhesive-applied state in FIG. 12C. FIG. 14B and FIG. 14C are schematic views showing an example of an adhesive-applied position in FIG. 14A. In FIG. 12A to FIG. 12C, FIG. 13A to FIG. 13C, and FIG. 14A to FIG. 14C, components have been partially simplified in order to facilitate understanding.

The first embodiment differs from the basic configuration in that a protective member 140 is laminated on a front surface (ejection surface 120) of the ejection orifice forming member 12. Specifically, as shown in FIG. 12A to FIG. 12C, the printing element substrate 10 includes the ejection surface 120. The ejection surface 120 is provided with a first ejection orifice array in which an ejection orifice configured to be capable of ejecting a liquid is arranged in plurality in an array direction and a second ejection orifice array arranged in a direction which intersects with the array direction and the first ejection orifice array. The protective member 140 is provided with a first opening which corresponds to the first ejection orifice array and a second opening which corresponds to the second ejection orifice array. In addition, the protective member 140 is arranged so as to be adjacent to the ejection surface 120 of the printing element substrate 10 via an adhesive arranged between the first ejection orifice array and the second ejection orifice array (hereinafter, also simply referred to as ejection orifice arrays 14). Note that among the ejection orifice arrays 14*a* to 14*d*, any ejection orifice array may be used as the first ejection orifice array. As will be described later, the ejection surface 120 is cleaned by a cleaning mechanism while abutting the cleaning mechanism. For example, the cleaning mechanism is a wiper which abuts and cleans the ejection surface 120 or the protective member 140. In order to have the cleaning mechanism (not illustrated) collect the liquid inside the liquid ejection head 3 in a more suitable manner, the ejection surface 120 and the protective member 140 in the vicinity of the ejection orifice arrays 14 are preferably configured so that a gap is not created between the ejection surface 120 and the protective member 140. Therefore, the protective member 140 is desirably bonded to the ejection surface 120 so that floating of the protective member 140 hardly occurs. To this end, as shown in FIG. 13A to FIG. 13C, for example, an adhesive 150 is applied to the ejection surface 120 between adjacent ejection orifice arrays 14 and the ejection surface 120 is bonded to the protective member 140 by the adhesive 150. As shown in FIG. 13A, the protective member 140 is moved in a direction of an arrow so that the protective member 140 bonds with the ejection surface 120. As shown in FIG. 13B, by intermittently applying the adhesive 150 in the array direction of the ejection orifice arrays between adjacent ejection orifice arrays 14, usage of the adhesive 150 can be reduced. In addition, a risk of an overflow of the adhesive 150 to the side of the ejection orifices 13 during application or thermosetting of the adhesive and the adhesive 150 flowing into the ejection orifices 13 can be reduced. When applying the adhesive 150 between adjacent ejection orifice arrays 14, as shown in FIG. 13B, the adhesive is preferably applied to a part (for example, a central part) of an area between the adjacent ejection orifice arrays 14 in the array direction in which the ejection orifice arrays 14 are arrayed.

On the other hand, as shown in FIG. 13C, the adhesive 150 may be continuously applied in the array direction of the ejection orifice arrays only between adjacent ejection orifice arrays 14 on the ejection surface 120. Accordingly, compared to intermittently applying the adhesive 150 on the ejection surface 120, an adhesion force between the ejection surface 120 and the protective member 140 can be made stronger. In addition, by applying the adhesive 150 only between adjacent ejection orifice arrays 14, an overflow of the adhesive 150 to an end in a longitudinal direction of the printing element substrate 10 can be suppressed. Adopting such a configuration can prevent an occurrence of a failure in which adhesive overflow prevents the printing element substrate 10 from being arranged when the printing element substrate 10 is arranged in plurality on a straight line (in-line) as shown in FIG. 11.

On the other hand, as shown in FIG. 14A to FIG. 14C, the adhesive 150 may be applied so as to enclose each of the plurality of ejection orifice arrays 14. Subsequently, as shown in FIG. 14A, the protective member 140 moves in a direction of an arrow and bonds with the ejection surface 120. Since adopting such a configuration increases locations where the adhesive 150 is applied, an adhesion force between the ejection surface 120 and the protective member 140 can be made even stronger. Furthermore, a method of forming an adhesion layer (not illustrated) on at least the side of the ejection surface 120 of the protective member 140 may also be suitably used in order to make the adhesion force between the ejection surface 120 and the protective member 140 even stronger. As the adhesive 150, for example, a thermosetting type of adhesive can be suitably used.

Such a configuration enables the protective member 140 to prevent the printed medium 2 (refer to FIG. 1) and the printing element substrate 10 from coming into contact with each other when the printed medium 2 floats during conveyance and a possibility of the liquid ejection head 3 becoming damaged can be reduced. Therefore, a material of the protective member 140 preferably has a higher modulus of elasticity than a material of the ejection orifice forming member 12. As the material of the protective member 140, for example, a metal material such as stainless steel or aluminum, silicon, or alumina may be suitably used. Above all, the material of the protective member 140 is preferably a material having a coefficient of linear expansion that is close to a coefficient of linear expansion of the material of the printing element substrate 10. Accordingly, a risk of the protective member 140 flaking off from the ejection orifice forming member 12 can be reduced. In addition, an outer shape of the protective member 140 and openings 141 are preferably processed with high accuracy. As a processing method of the protective member 140, for example, etching, laser processing, or machining may be suitably used. By the processing method, when a burr or a raised edge is formed in the outer shape of the protective member 140 and an edge part of the openings 141, the possibility of the cleaning mechanism (not illustrated) becoming damaged can be reduced by using a surface on which the burr or the raised edge has been formed as an adhesive surface side with the ejection surface 120. In addition, the processing method of the protective member 140 may be changed between rear and front surfaces or for each location of the protective member 140. For example, since the outer shape of the protective member 140 and the openings 141 are given tapered shapes due to etching, by changing etching conditions and adjusting taper angles between the front and rear surfaces of the protective member 140, the liquid inside the liquid ejection head 3 can also be made more suitably collectible. Such a processing method can be relatively readily performed in a configuration in which the opening 141 is formed for each ejection orifice array 14 as in the present disclosure as compared to a configuration in which an opening is formed for each ejection orifice.

During maintenance between one print job in which printing is performed on a printed medium and a next print job, the cleaning mechanism (not illustrated) of the printing apparatus abuts the protective member 140 laminated on the printing element substrate 10 to collect the liquid inside the liquid ejection head 3 and clean a periphery of the ejection orifices 13. For example, a wiper made of a rubber material may be used as the cleaning mechanism (not illustrated). By having the wiper abut both the protective member 140 and the ejection surface 120, even when the liquid is sticking to a periphery of the ejection orifices 13, the liquid inside the liquid ejection head 3 can be collected and the periphery of the ejection orifices 13 can be cleaned more suitably.

When the openings 141 of the protective member 140 are excessively large, the possibility of the printed medium 2 and the printing element substrate 10 coming into contact with each other and damaging the liquid ejection head 3 increases when the printed medium 2 floats during conveyance due to a paper jam or the like. Therefore, a ratio of a total area (an opening ratio) of the openings 141 of the protective member 140 to an area of a main face of the protective member 140 is preferably 70% or lower. In addition, a width of the respective openings 141 may be equal to or larger than a diameter of the respective ejection orifices and less than an interval between adjacent ejection orifice arrays and a thickness of the protective member 140 may be equal to or less than a thickness of the printing element substrate 10. For example, preferably, the width of the respective openings 141 is set to 200 μm or more and the thickness of the protective member 140 is set to less than 50 μm. Accordingly, stress when the printed medium 2 and the printing element substrate 10 come into contact with each other can be reduced and the possibility of damaging the liquid ejection head 3 can be reduced while ensuring cleanability of the periphery of the ejection orifices 13. Furthermore, even when foreign objects such as dust have entered the pressure chamber 23 due to the printed medium 2 coming into contact with the ejection orifices 13, the foreign objects can be made to flow out from the pressure chamber 23 by circulating the liquid inside the pressure chamber 23 between the inside and the outside of the pressure chamber 23 as described earlier.

Figure 15A:
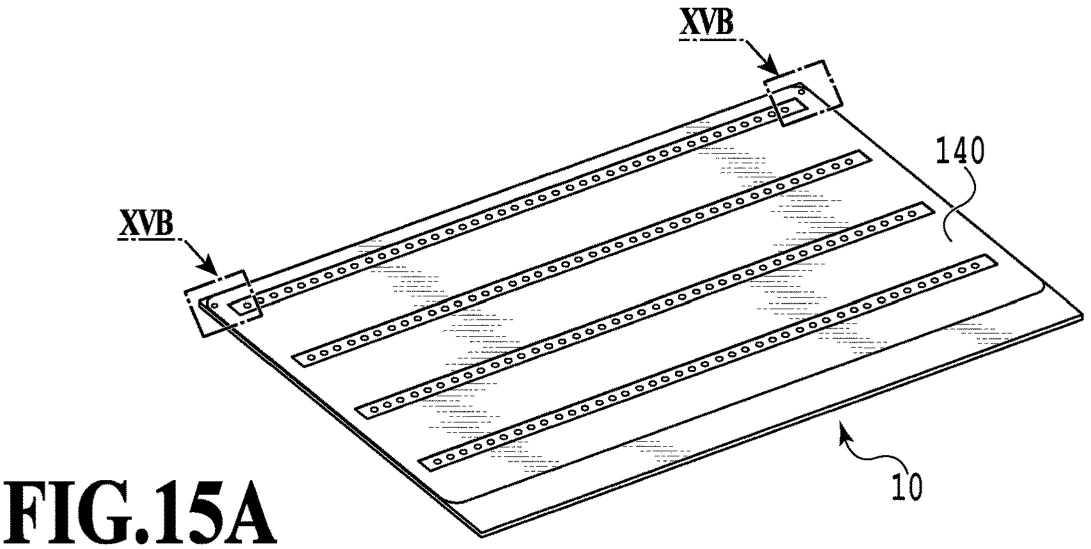
FIG. 15A to FIG. 15C are a perspective view and a partial enlarged view showing a modification of an ejection module of the liquid ejection head according to the first embodiment.
Figure 15B:
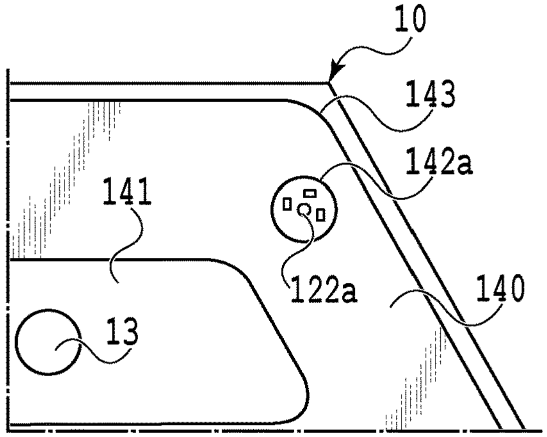
Figure 15C:
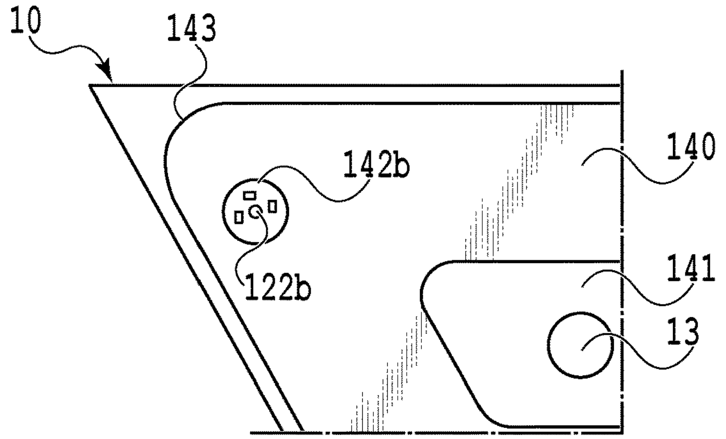

FIG. 15A is a perspective view of a simplified ejection module representing a modification of FIG. 12A. FIG. 15B is an enlarged view of a portion denoted by XVB in FIG. 15A. FIG. 15C is an enlarged view of a portion denoted by XVC in FIG. 15A. In FIG. 15A to FIG. 15C, components have been partially simplified in order to facilitate understanding.

As a modification of the first embodiment, as shown in FIG. 15B and FIG. 15C, a corner part 143 of the protective member 140 may be formed in an R shape (rounded or with a radius). Accordingly, a risk of damage to the cleaning mechanism (not illustrated) of the printing apparatus due to a corner part of the protective member 140 when the cleaning mechanism (not illustrated) abuts the liquid ejection head 3 during maintenance between print jobs can be reduced.

Alignment marks 122*a* and 122*b* to be used for positioning between adjacent printing element substrates 10 may be formed on the printing element substrates 10. In addition, a printing element substrate number (not illustrated) for identification of the printing element substrate 10 or an ejection orifice number (not illustrated) for position identification of each ejection orifice 13 may be formed on the printing element substrate 10. In order to identify these components, openings 142*a* and 142*b* or notches (not illustrated) may be formed in the protective member 140 in conformity with the alignment marks 122*a* and 122*b*, the printing element substrate number (not illustrated), and the ejection orifice number (not illustrated). The notches (not illustrated) may be formed in an R shape. Accordingly, each printing element substrate 10 is capable of positioning each printing element substrate, identifying each printing element substrate, and identifying each ejection orifice.

Second Embodiment

A second embodiment of the present disclosure will be described. Descriptions of functions and components similar to the basic configuration and the first embodiment of the present disclosure will be omitted and different points will be described.

Figure 16A:
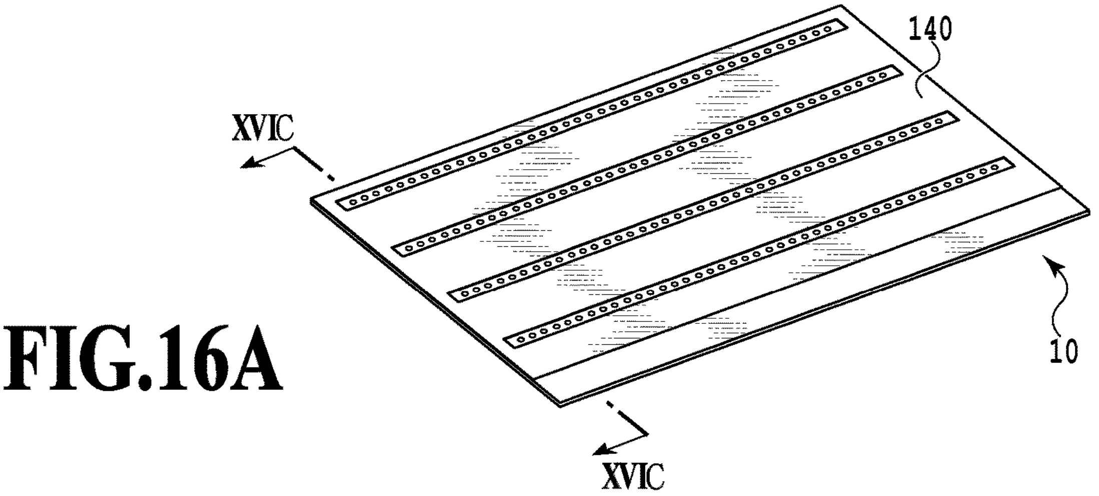
FIG. 16A to FIG. 16C are a perspective view, an exploded perspective view, and a sectional view of an ejection module of a liquid ejection head according to a second embodiment.
Figure 16B:
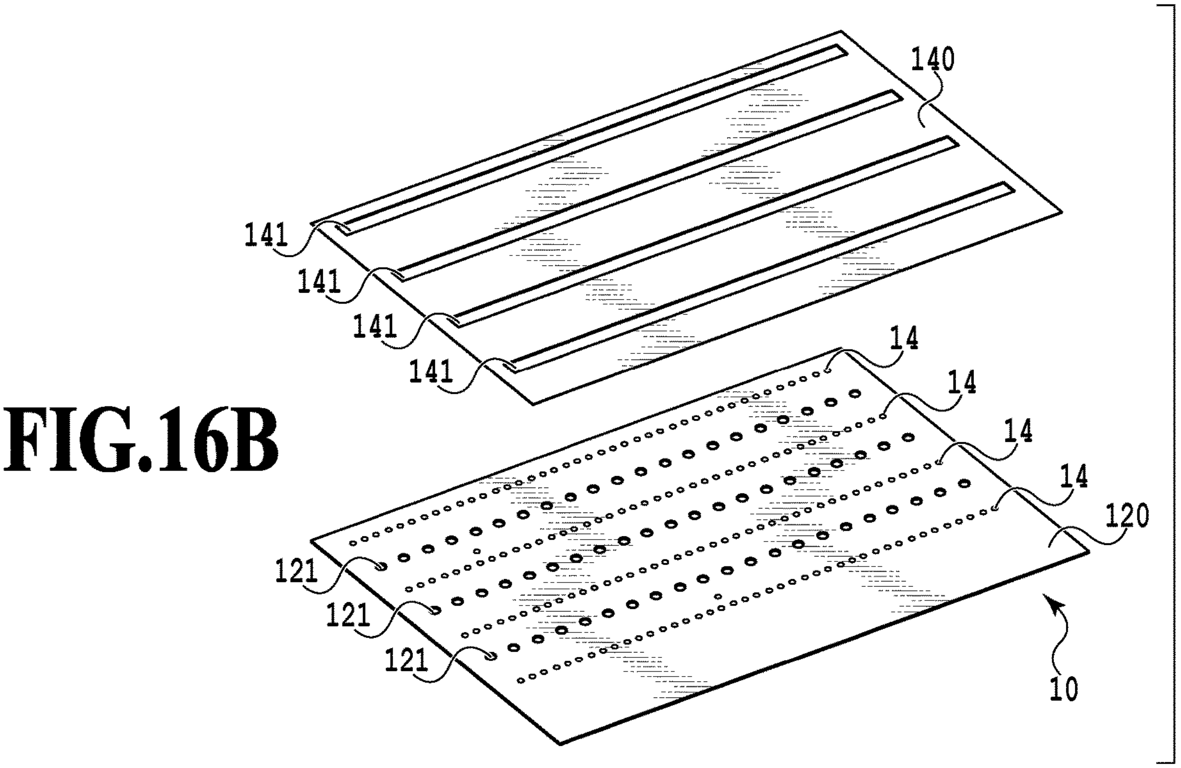
Figure 16C:
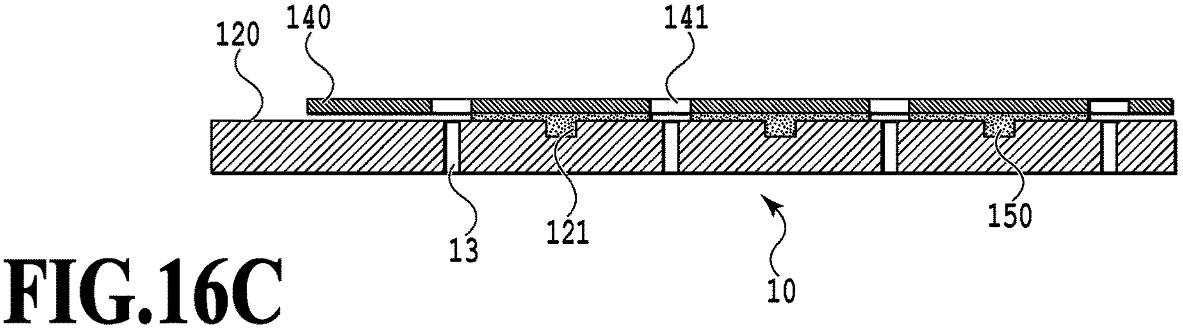
Figure 17A:
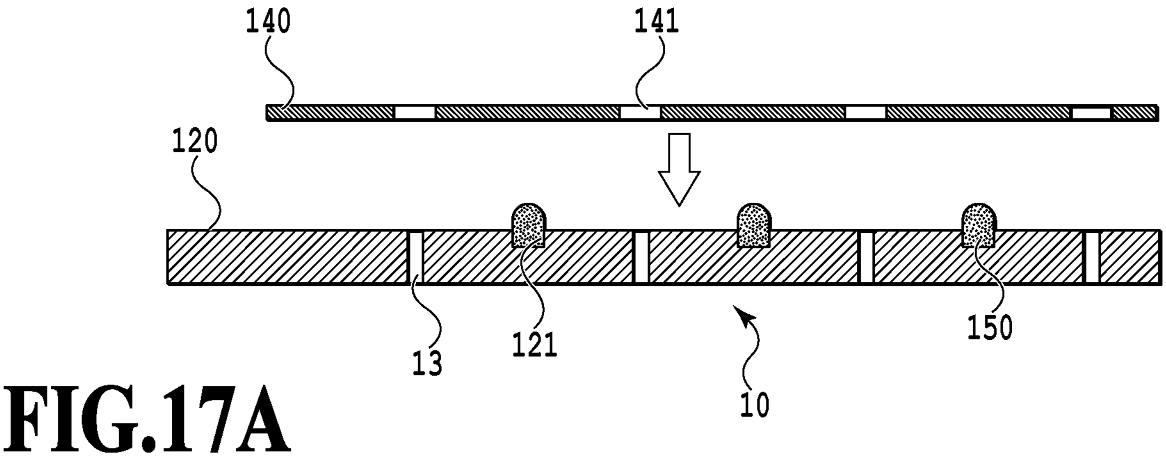
FIG. 17A to FIG. 17C are schematic views showing an adhesive-applied state in FIG. 16C.
Figure 17B:
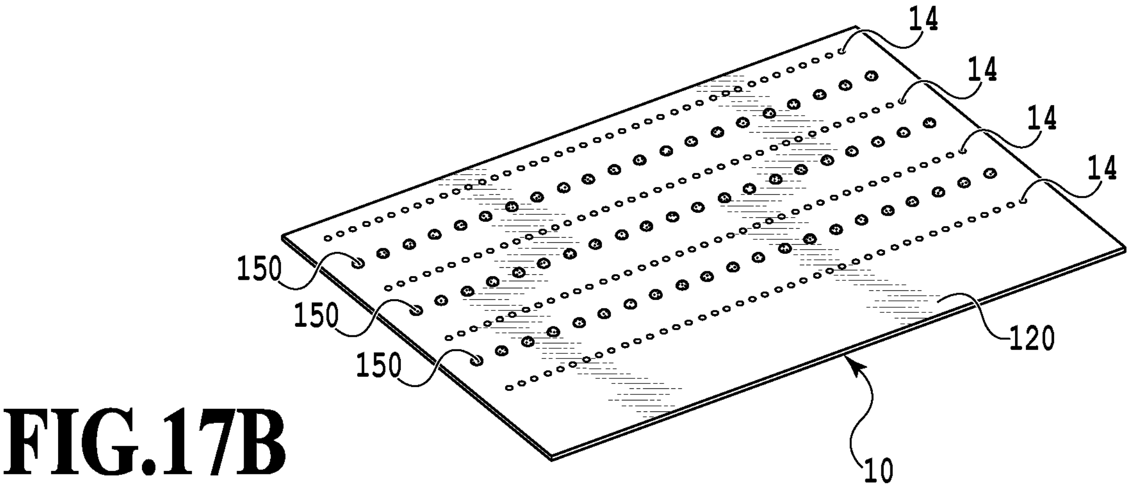
Figure 17C:
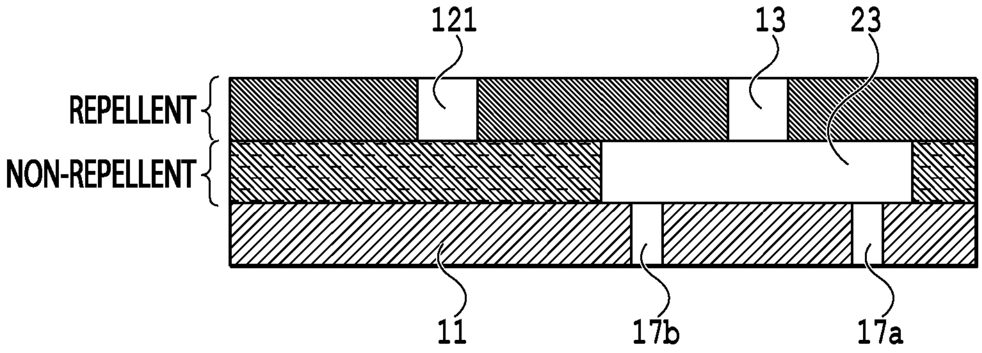

FIG. 16A is a perspective view of a simplified ejection module in the second embodiment. FIG. 16B is an exploded perspective view of FIG. 16A. FIG. 16C is a sectional view taken along a line XVIC-XVIC in FIG. 16A. FIG. 17A is a schematic view showing an adhesive-applied state in FIG. 16C. FIG. 17B is a schematic view showing an example of an adhesive-applied position in FIG. 17A. FIG. 17C is a schematic view showing details of a vicinity of a recessed part in FIG. 17A. In FIG. 16A to FIG. 16C and FIG. 17A to FIG. 17C, components have been partially simplified in order to facilitate understanding.

The second embodiment differs from the first embodiment in that recessed parts 121 are formed on the ejection surface 120. Specifically, as shown in FIG. 16A to FIG. 16C and FIG. 17A to FIG. 17C, recessed parts 121 are formed between adjacent ejection orifice arrays 14 on the ejection surface 120. In addition, the adhesive 150 is applied to the recessed parts 121 on the ejection surface 120 and the protective member 140 is moved in a direction of an arrow (an arrow direction in FIG. 17A) and is bonded to the ejection surface 120. The recessed parts 121 may be formed at center between adjacent ejection orifice arrays 14. While the recessed parts 121 are formed at center between adjacent ejection orifice arrays 14, the recessed parts 121 are not limited thereto and may be formed anywhere between the adjacent ejection orifice arrays 14 as long as an overflow of the adhesive does not occur when bonding the ejection surface 120 and the protective member 140 to each other. Adopting such a configuration enables an applied position of the adhesive 150 to be readily controlled. In addition, bonding between the ejection surface 120 and the protective member 140 enables an adhesion force to be made stronger as compared to simply applying the adhesive to a planer section of the ejection surface 120. Furthermore, by applying the adhesive 150 only between adjacent ejection orifice arrays 14, an appropriate amount of the adhesive 150 spreads and an overflow of the adhesive 150 to an end in a longitudinal direction of the printing element substrate 10 can be suppressed. Accordingly, even when the printing element substrate 10 is arranged in plurality on a straight line (in-line) as shown in FIG. 11, the printing element substrates can be arranged without causing an overflow of the adhesive.

A depth of the recessed parts 121 may be a depth that prevents an overflow of the adhesive 150 when bonding the protective member 140 and the ejection surface 120 to each other and, for example, a preferable depth is 6 μm. In addition, while the recessed parts 121 are formed on the ejection surface 120 in the present embodiment, the shape of the recessed parts may be formed in a semicircular shape, a triangular shape, or the like. Accordingly, an appropriate amount of the adhesive spreads between the ejection surface 120 and the protective member 140 and an overflow of the adhesive can be suppressed.

Preferably, the ejection surface 120 has repellency with respect to liquid but the recessed parts 121 have non-repellency. Accordingly, the adhesive 150 more readily pools in the recessed parts 121 (FIG. 17A) and a risk of the adhesive 150 flowing into the ejection orifices 13 can be reduced. An example of imparting non-repellency to the recessed parts 121 is a method of respectively forming the ejection orifices 13 with a repellent layer and the pressure chamber 23 with a non-repellent layer and forming the recessed parts 121 by removing parts of the repellent layer as shown in FIG. 17C.

Modification of Second Embodiment

Figure 18A:
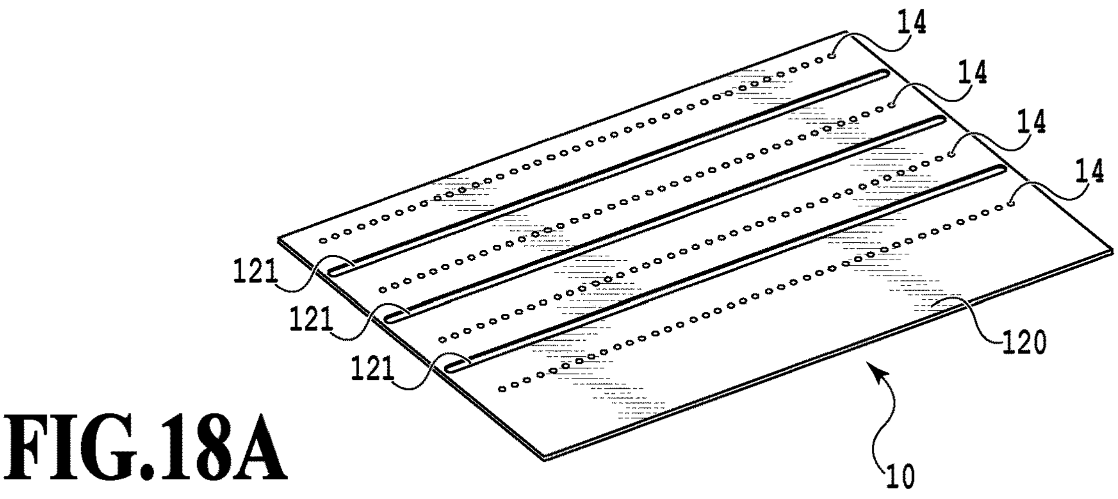
FIG. 18A to FIG. 18C are schematic perspective views showing a modification of a printing element substrate of the liquid ejection head according to the second embodiment.
Figure 18B:
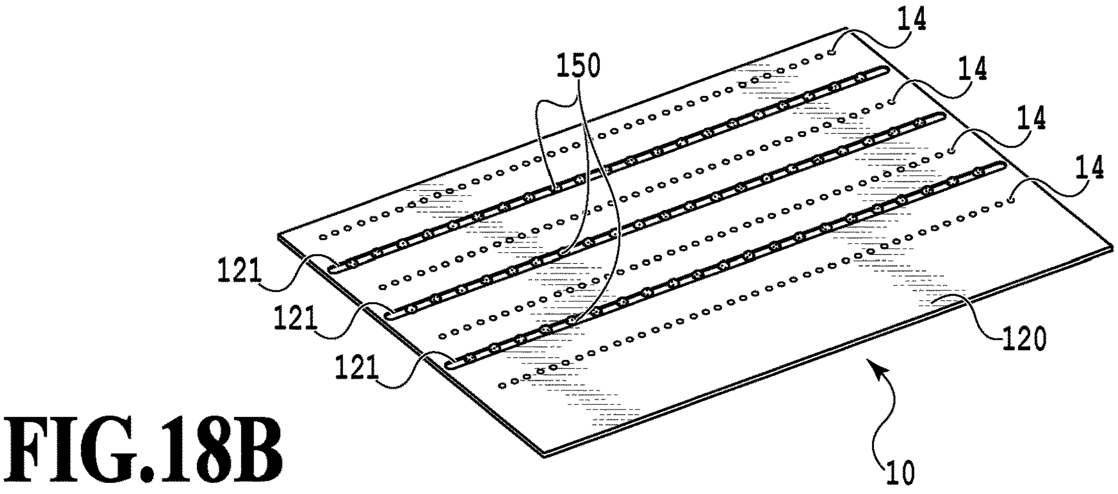
Figure 18C:
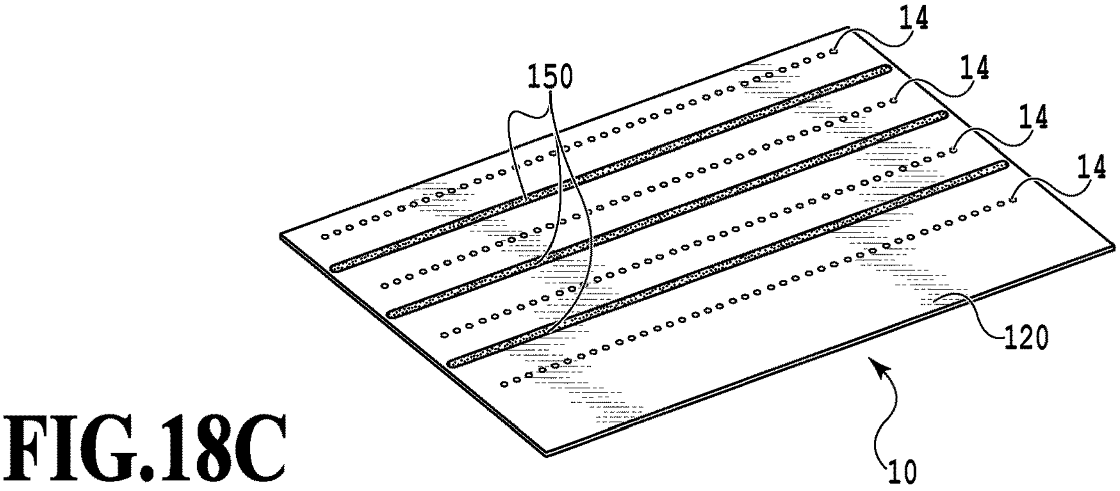

FIG. 18A is a perspective view of a simplified printing element substrate representing a modification of FIG. 16B. FIG. 18B and FIG. 18C are schematic views showing an example of an adhesive-applied position in FIG. 18A. In FIG. 18A to FIG. 18C, components have been partially simplified in order to facilitate understanding.

As a modification of the second embodiment, as shown in FIG. 18A to FIG. 18C, the recessed parts 121 formed between adjacent ejection orifice arrays 14 may be formed by being connected in a groove shape. A width of the recessed parts 121 is preferably smaller than a beam width in adjacent openings 141. Accordingly, an overflow of the adhesive 150 to the side of the ejection orifices 13 when bonding the ejection surface 120 and the protective member 140 to each other can be prevented and a risk of the adhesive 150 flowing into the ejection orifices 13 can be reduced. In addition, as an example, as shown in FIG. 18B, by intermittently applying the adhesive 150 in an extending direction of the ejection orifice arrays in the recessed parts 121 formed in a groove shape, usage of the adhesive 150 can be reduced. Furthermore, a risk of an overflow of the adhesive 150 to the side of the ejection orifices 13 during application or thermosetting of the adhesive and the adhesive 150 flowing into the ejection orifices 13 can be reduced. On the other hand, as shown in FIG. 18C, the adhesive 150 may be continuously applied in the extending direction of the ejection orifice arrays in the recessed parts 121 formed in a groove shape. Accordingly, bonding between the ejection surface 120 and the protective member 140 can be made stronger as compared to intermittently applying the adhesive 150.

Third Embodiment

A third embodiment of the present disclosure will be described. Descriptions of functions and components similar to the basic configuration, the first embodiment, and the second embodiment of the present disclosure will be omitted and different points will be described.

Figure 19A:
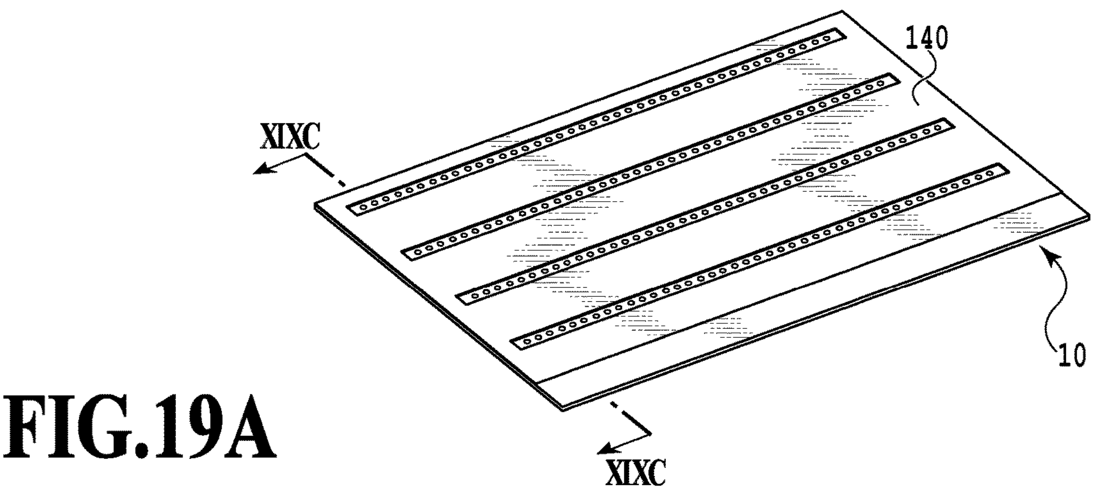
FIG. 19A to FIG. 19C are a perspective view, an exploded perspective view, and a sectional view of an ejection module of a liquid ejection head according to a third embodiment.
Figure 19B:
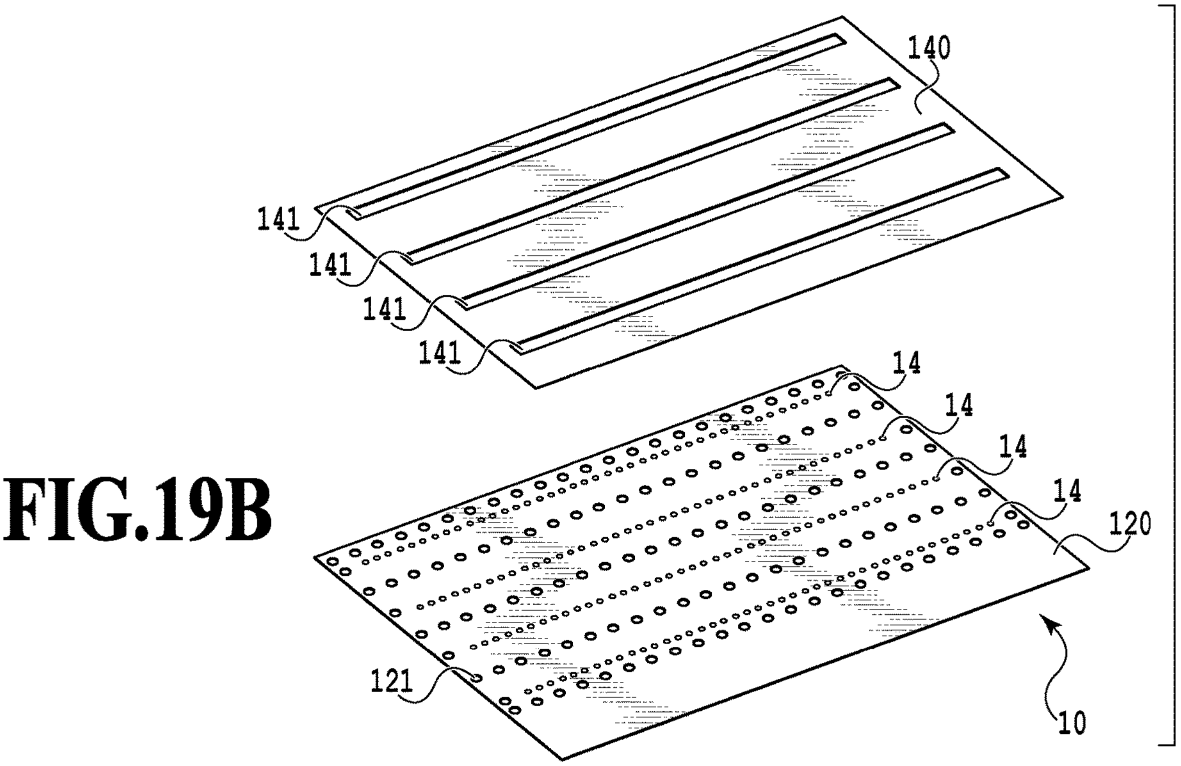
Figure 19C:
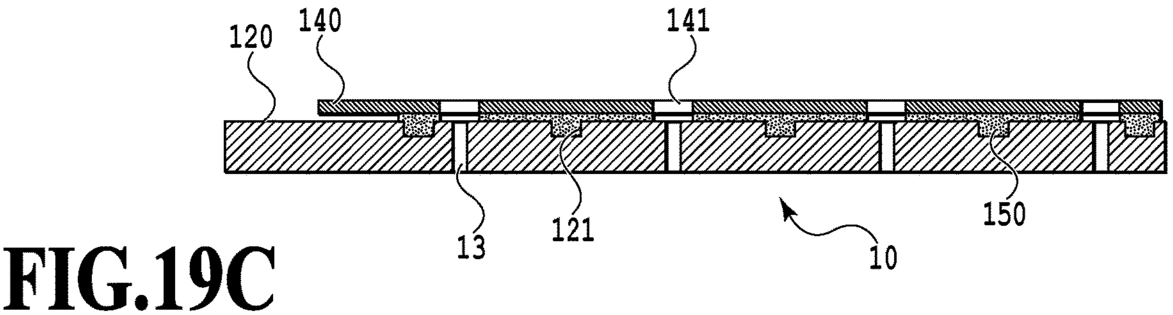
Figure 20A:
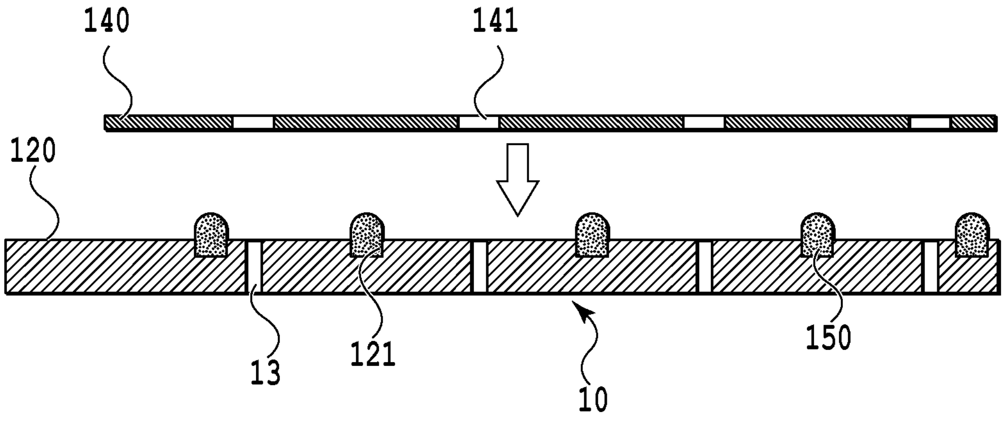
FIG. 20A and FIG. 20B are schematic views showing an adhesive-applied state in FIG. 19C.
Figure 20B:
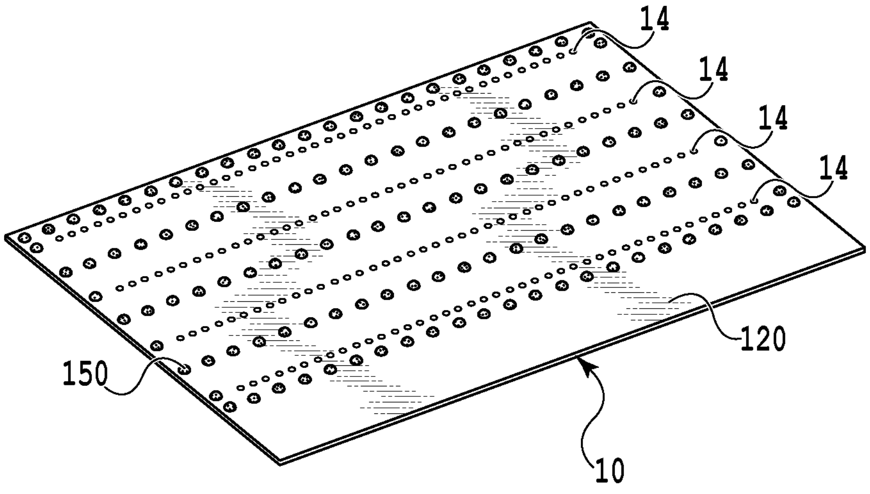

FIG. 19A is a perspective view of a simplified ejection module in the third embodiment. FIG. 19B is an exploded perspective view of FIG. 19A. FIG. 19C is a sectional view taken along a line XIXC-XIXC in FIG. 19A. FIG. 20A is a schematic view showing an adhesive-applied state in FIG. 19C. FIG. 20B is a schematic view showing an example of an adhesive-applied position in FIG. 20A. In FIG. 19A to FIG. 19C, FIG. 20A, and FIG. 20B, components have been partially simplified in order to facilitate understanding.

The third embodiment differs from the second embodiment in that recessed parts 121 are formed so as to enclose each of the plurality of ejection orifice arrays 14. Specifically, as shown in FIGS. 19A to 19C, FIG. 20A, and FIG. 20B, recessed parts 121 are formed so as to enclose each of the plurality of ejection orifice arrays 14 on the ejection surface 120. In addition, the adhesive 150 is applied to the recessed parts 121 on the ejection surface 120 and the protective member 140 is moved in a direction of an arrow (an arrow direction in FIG. 20A) and is bonded to the ejection surface 120. Since adopting such a configuration increases locations where the ejection surface 120 and the protective member 140 are bonded to each other, bonding between the ejection surface 120 and the protective member 140 can be made even stronger.

Figure 21A:
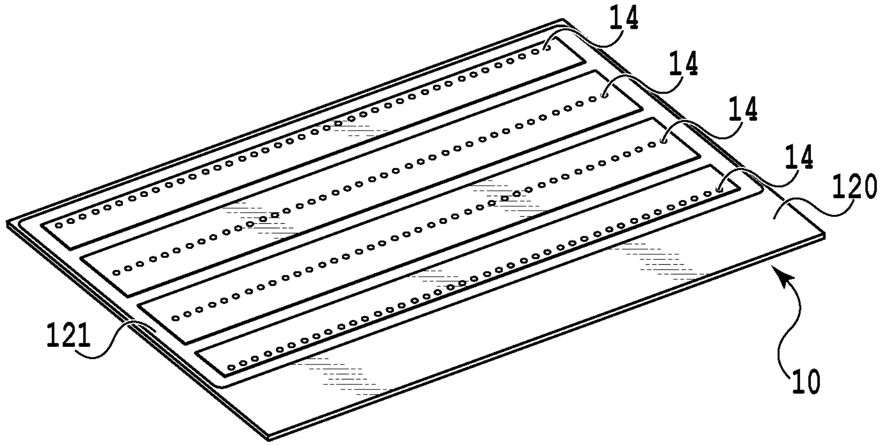
FIG. 21A to FIG. 21C are schematic perspective views showing a modification of a printing element substrate of the liquid ejection head according to the third embodiment.
Figure 21B:
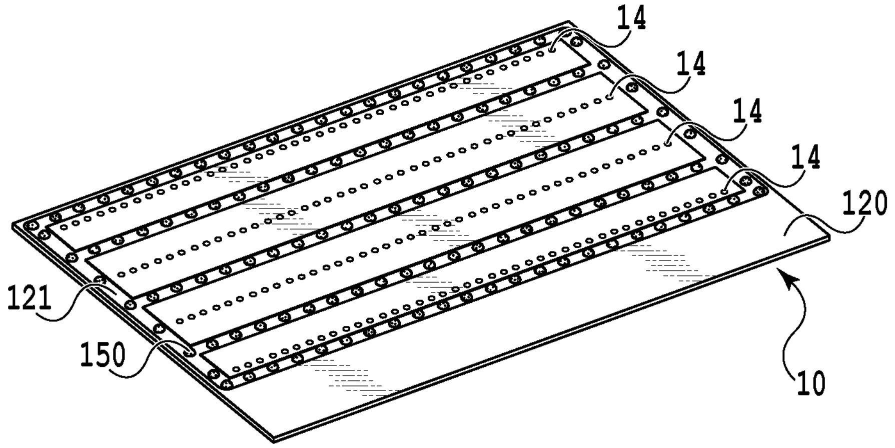
Figure 21C:
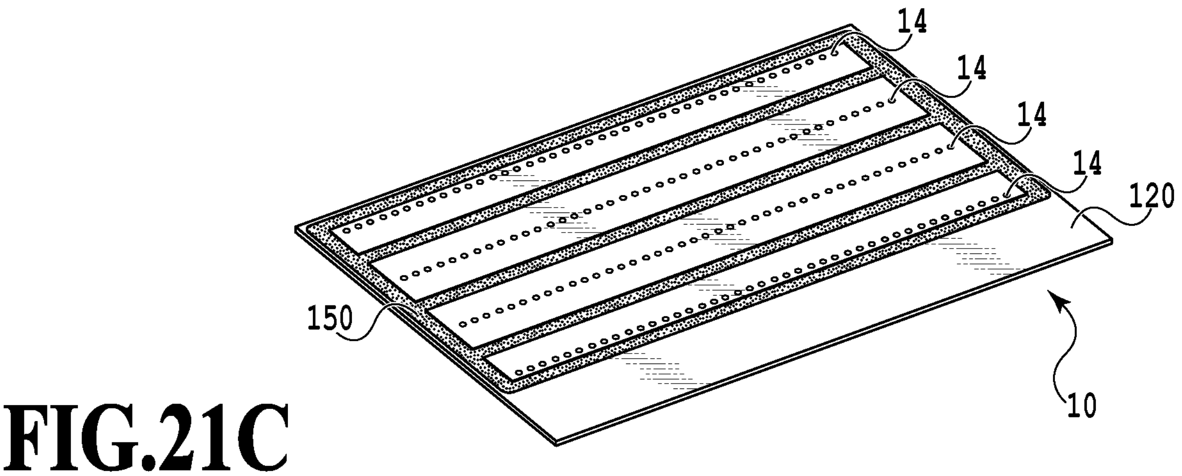

FIG. 21A is a perspective view of a simplified printing element substrate representing a modification of FIG. 19B. FIG. 21B and FIG. 21C are schematic views showing an example of an adhesive-applied position in FIG. 21A. In FIG. 21A to FIG. 21C, components have been partially simplified in order to facilitate understanding.

As a modification of the third embodiment, as shown in FIG. 21A to FIG. 21C, the recessed parts 121 formed so as to enclose each of the plurality of ejection orifice arrays 14 may be formed by being connected in a groove shape. As an example, as shown in FIG. 21B, by intermittently applying the adhesive 150 in an extending direction of the ejection orifice arrays in the recessed parts 121 formed in a groove shape, usage of the adhesive 150 can be reduced. In addition, a risk of an overflow of the adhesive 150 to the side of the ejection orifices 13 during application or thermosetting of the adhesive and the adhesive 150 flowing into the ejection orifices 13 can be reduced. On the other hand, as shown in FIG. 21C, by continuously applying the adhesive 150 in an extending direction of the ejection orifice arrays in the recessed parts 121 formed in a groove shape, bonding between the ejection surface 120 and the protective member 140 can be made even stronger as compared to intermittently applying the adhesive 150.

Fourth Embodiment

A fourth embodiment of the present disclosure will be described. Descriptions of functions and components similar to the basic configuration and the first to third embodiments of the present disclosure will be omitted and different points will be described.

Figure 22A:
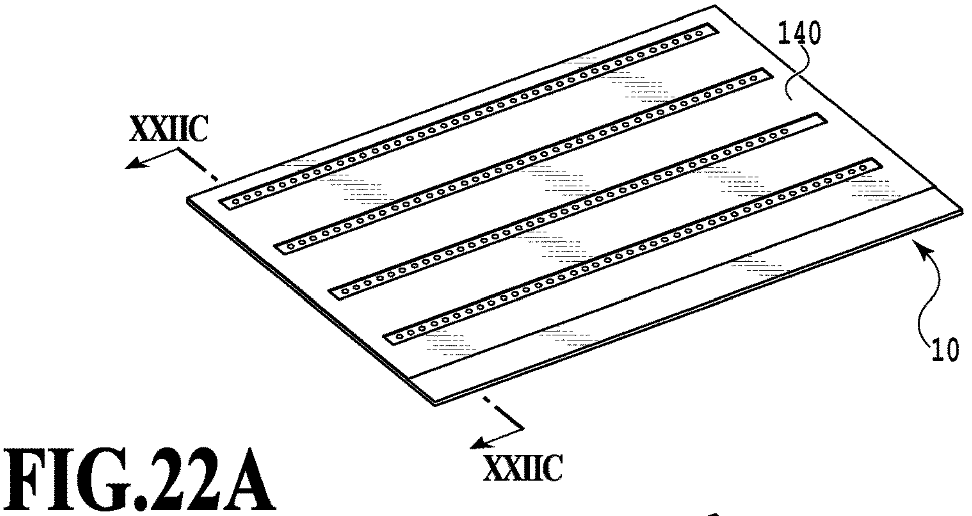
FIG. 22A to FIG. 22C are a perspective view, an exploded perspective view, and a sectional view of an ejection module of a liquid ejection head according to a fourth embodiment.
Figure 22B:
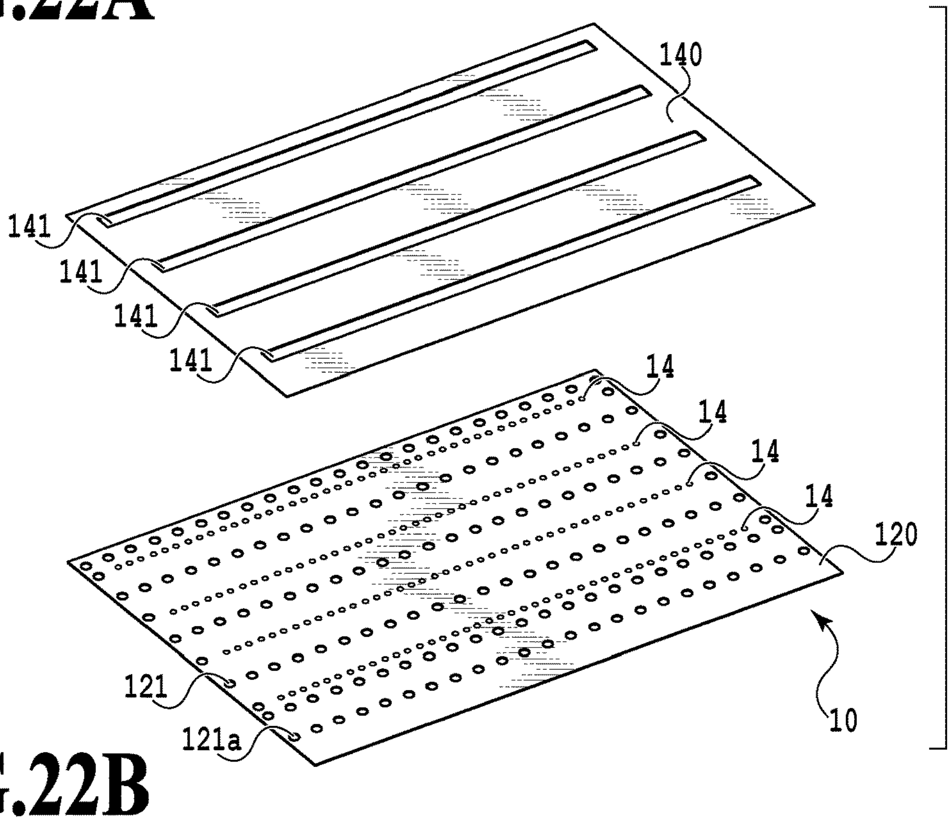
Figure 22C:
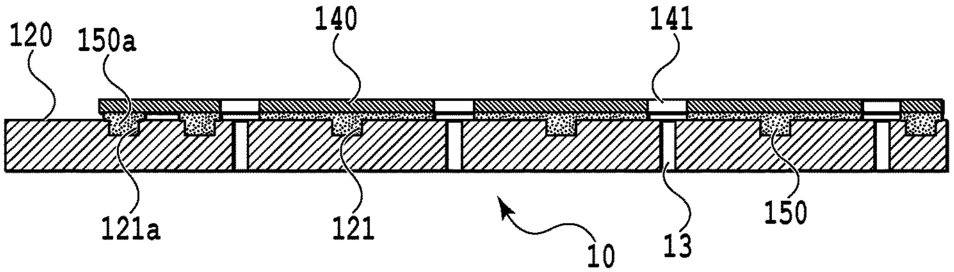
Figure 23A:
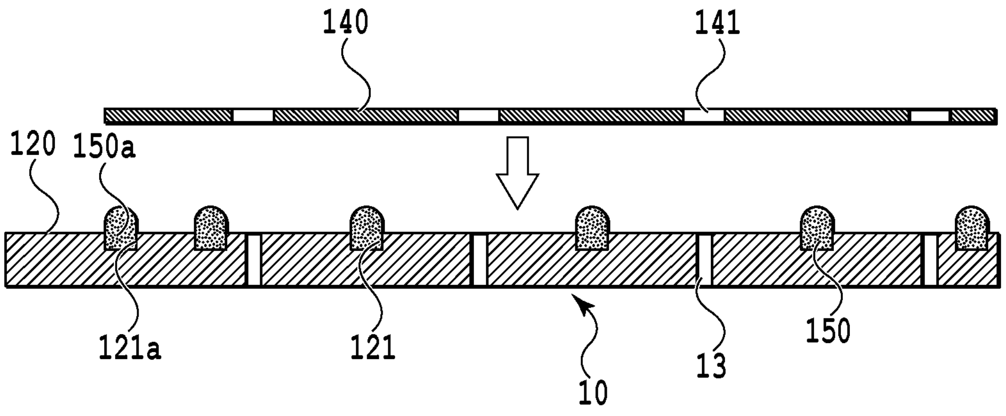
FIG. 23A and FIG. 23B are schematic views showing an adhesive-applied state in FIG. 22C.
Figure 23B:
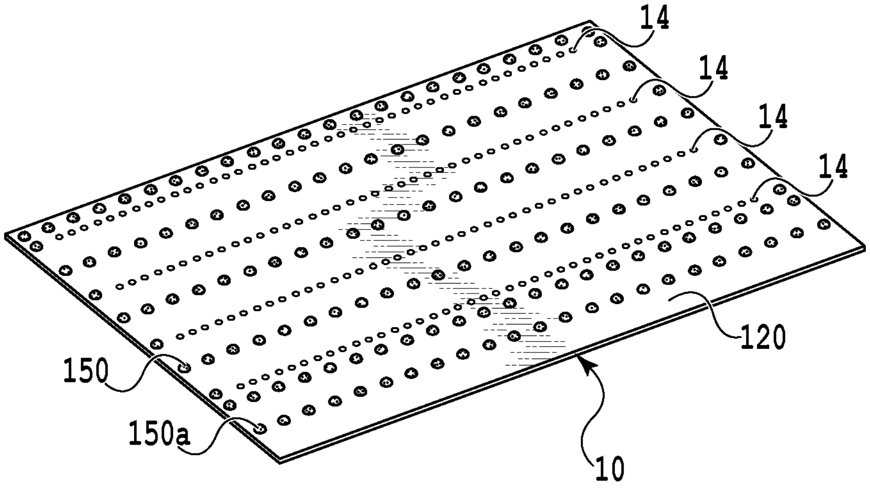

FIG. 22A is a perspective view of a simplified ejection module in the fourth embodiment. FIG. 22B is an exploded perspective view of FIG. 22A. FIG. 22C is a sectional view taken along a line XXIIC-XXIIC in FIG. 22A. FIG. 23A is a schematic view showing an adhesive-applied state in FIG. 22C. FIG. 23B is a schematic view showing an example of an adhesive-applied position in FIG. 23A. In FIG. 22A to FIG. 22C, FIG. 23A, and FIG. 23B, components have been partially simplified in order to facilitate understanding.

The fourth embodiment differs from the third embodiment in that recessed parts 121*a* are formed on an outer side of an outermost ejection orifice array in a direction intersecting with an extending direction of the ejection orifice arrays 14. Specifically, as shown in FIG. 22A to FIG. 22C, FIG. 23A, and FIG. 23B, recessed parts 121 are formed so as to enclose each of the plurality of ejection orifice arrays 14 on the ejection surface 120. In addition, the recessed parts 121*a* are further formed on an outer side of the recessed parts 121 being formed so as to enclose each of the plurality of ejection orifice arrays 14 on the ejection surface 120. Furthermore, the adhesive 150 and an adhesive 150*a* are respectively applied to the recessed parts 121 and the recessed parts 121*a* on the ejection surface 120 and the protective member 140 is moved in a direction of an arrow (an arrow direction in FIG. 23A) and is bonded to the ejection surface 120. A same adhesive is desirably used as the adhesive 150 and the adhesive 150*a*. In addition, the recessed parts 121*a* preferably have non-repellency with respect to the liquid in a similar manner to the recessed parts 121. Since adopting such a configuration increases bonding locations, bonding between the ejection surface 120 and the protective member 140 can be made even stronger.

Fifth Embodiment

Figure 24A:
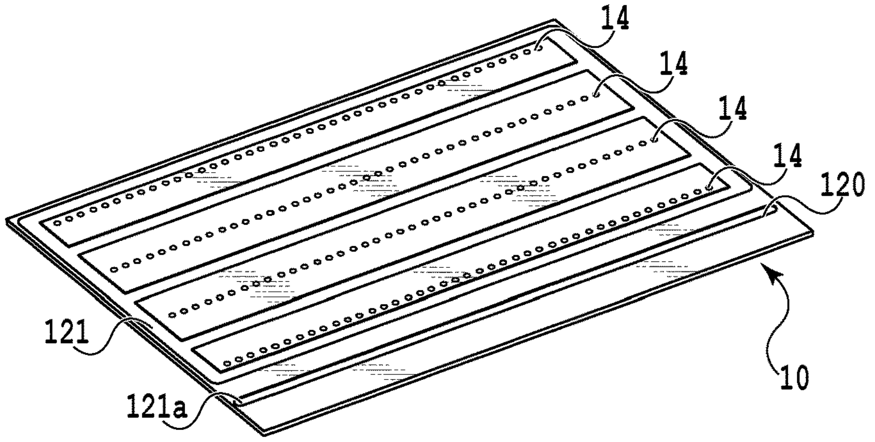
FIG. 24A to FIG. 24C are schematic perspective views showing a printing element substrate of a liquid ejection head according to a fifth embodiment.
Figure 24B:
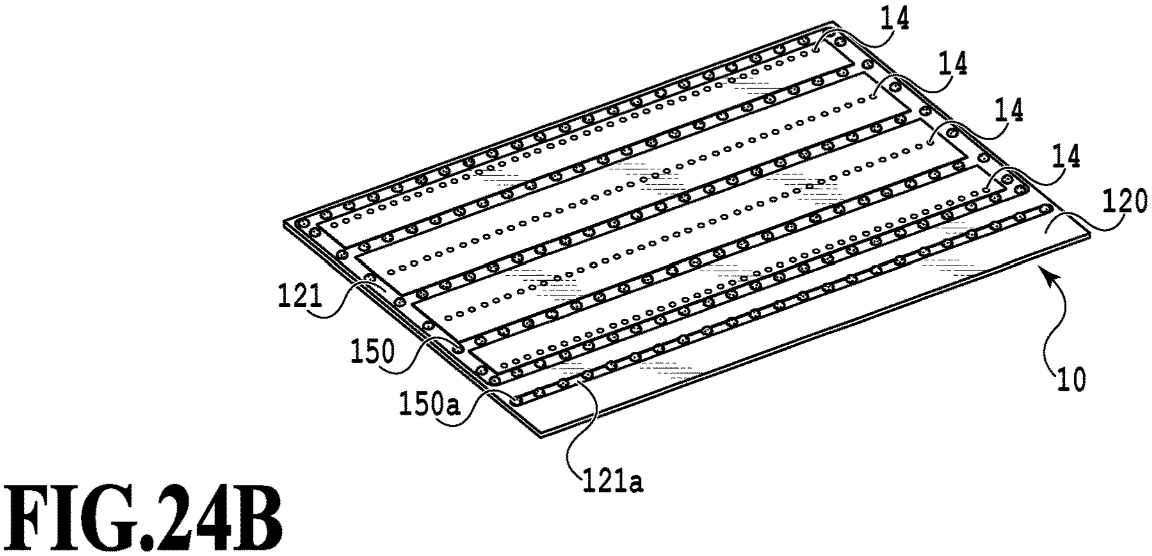
Figure 24C:
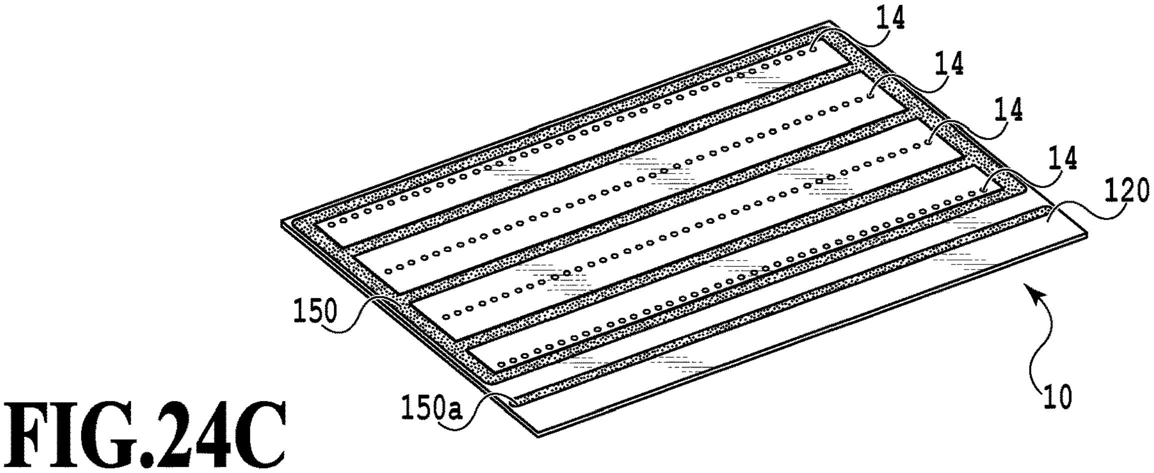

FIG. 24A is a perspective view of a simplified printing element substrate representing a modification of FIG. 22B. FIG. 24B and FIG. 24C are schematic views showing an example of an adhesive-applied position in FIG. 24A. In FIG. 24A to FIG. 24C, components have been partially simplified in order to facilitate understanding.

As a fifth embodiment, as shown in FIG. 24A to FIG. 24C, the recessed parts 121 formed so as to enclose each of the plurality of ejection orifice arrays 14 and the recessed parts 121*a* formed on an outer side of an outermost ejection orifice array in a direction intersecting with the extending direction of the ejection orifice arrays 14 may be respectively formed by being connected in a groove shape. As an example, as shown in FIG. 24B, by respectively intermittently applying the adhesive 150 and the adhesive 150*a* to the recessed parts 121 and the recessed parts 121*a* formed in a groove shape, usage of the adhesive 150 and the adhesive 150*a* can be reduced. In addition, a risk of an overflow of the adhesive 150 to the side of the ejection orifices 13 during application or thermosetting of the adhesive and the adhesive 150 flowing into the ejection orifices 13 can be reduced. On the other hand, as shown in FIG. 24C, the adhesive 150 and the adhesive 150*a* are respectively applied in a continuous way in the extending direction of the ejection orifice arrays in the recessed parts 121 and the recessed parts 121*a* formed in a groove shape. Accordingly, compared to respectively intermittently applying the adhesive 150 and the adhesive 150*a*, bonding between the ejection surface 120 and the protective member 140 can be made stronger.

Sixth Embodiment

Figure 25:
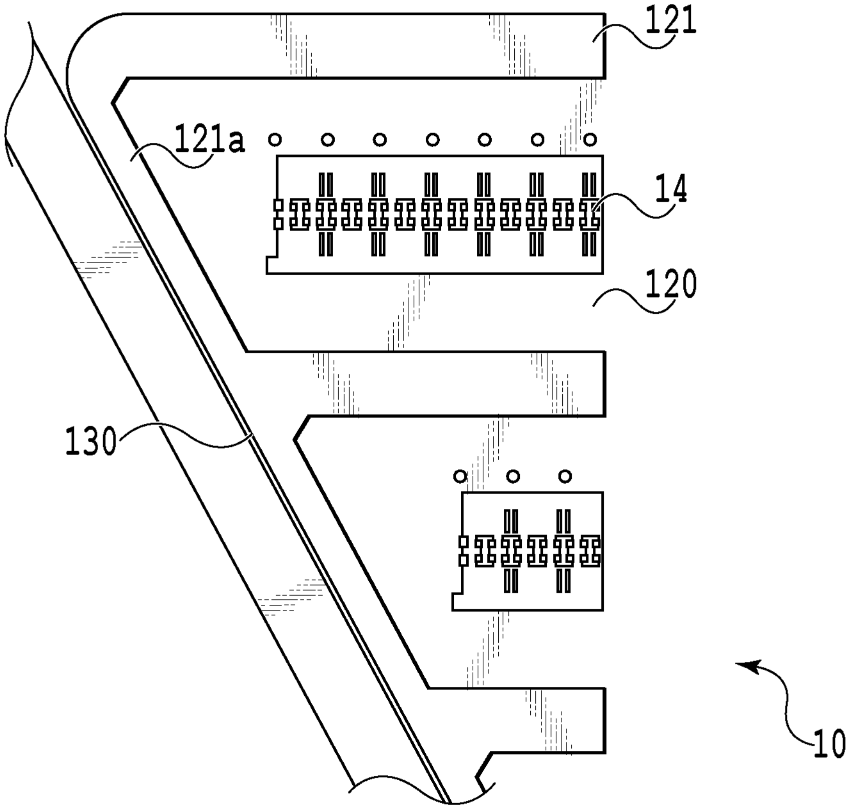
FIG. 25 is a schematic partial enlarged view showing a printing element substrate of a liquid ejection head according to a sixth embodiment.

FIG. 25 is a schematic view of a part of a simplified printing element substrate representing a modification of FIG. 24A to FIG. 24C.

A sixth embodiment may be shaped such that when comparing a groove width in a transverse direction of the recessed parts 121 with a groove width in a transverse direction of the recessed parts 121*a* formed on the outer side of the outermost ejection orifice array in a direction intersecting with the extending direction of the ejection orifice arrays 14, the groove width in the transverse direction of the recessed parts 121*a* is narrower.

Since adopting such a shape causes an adhesive to penetrate into the recessed parts 121*a* by capillary force by simply applying the adhesive to the recessed parts 121 and enables a step of applying the adhesive to the recessed parts 121*a* to be omitted, process time can be reduced.

In a relationship between the protective member 140 and the groove widths of the recessed parts 121 and the recessed parts 121*a*, adhesion strength increases when the groove widths of the recessed parts 121 and the recessed parts 121*a* are wider. On the other hand, the groove widths of the recessed parts 121 and the recessed parts 121*a* are preferably narrower than the protective member 140 so that overflow of the adhesive to the ejection surface 120 from the protective member 140 does not occur. In addition, with respect to a width in a transverse direction of the protective member 140 between ejection orifice arrays, an area of an ejection orifice array opening portion affects a recovery action for refreshing the ejection orifices. Furthermore, in terms of recoverability, the larger the area of the ejection orifice array opening portion and, conversely, the narrower the width in the transverse direction of the protective member 140 between ejection orifice arrays, the higher the recoverability. In a preferable example, the width in the transverse direction of the protective member 140 between ejection orifice arrays ranges from 200 μm or more and 250 μm or less, the groove width in the transverse direction of the recessed parts 121 ranges from 80 μm or more and 120 μm or less, and the groove width in the transverse direction of the recessed parts 121*a* ranges from 30 μm or more and 70 μm or less.

In addition, a part of an intersecting part of the recessed part 121 and the recessed part 121*a* may have a chamfered shape as shown in FIG. 25. Accordingly, an adhesive more readily flows from the recessed part 121 to the recessed part 121*a*. Furthermore, in a portion where the intersecting part has an obtuse angle, the ease with which the adhesive flows is not significantly increased by chamfering. Therefore, a portion where the intersecting part has an obtuse angle may be given a non-chamfered shape, and by increasing portions which are not chamfered, an area of openings between the ejection orifice arrays can be increased and an effect on recoverability can be reduced.

In addition, as shown in FIG. 25, a remaining part between a chip end in an ejection orifice array direction and the recessed part 121*a* is formed. In order to maintain strength of the protective member while further reducing a distance between chips in the case of a head configuration in which the chips are arranged by being lined up in the ejection orifice array direction, a chip end remaining part 130 is preferably configured so that a groove width of the recessed part 121*a* does not become too narrow. In a preferable example, a width in a transverse direction of the chip end remaining part 130 is 5 μm or more and 20 μm or less.

Seventh Embodiment

Figure 26:
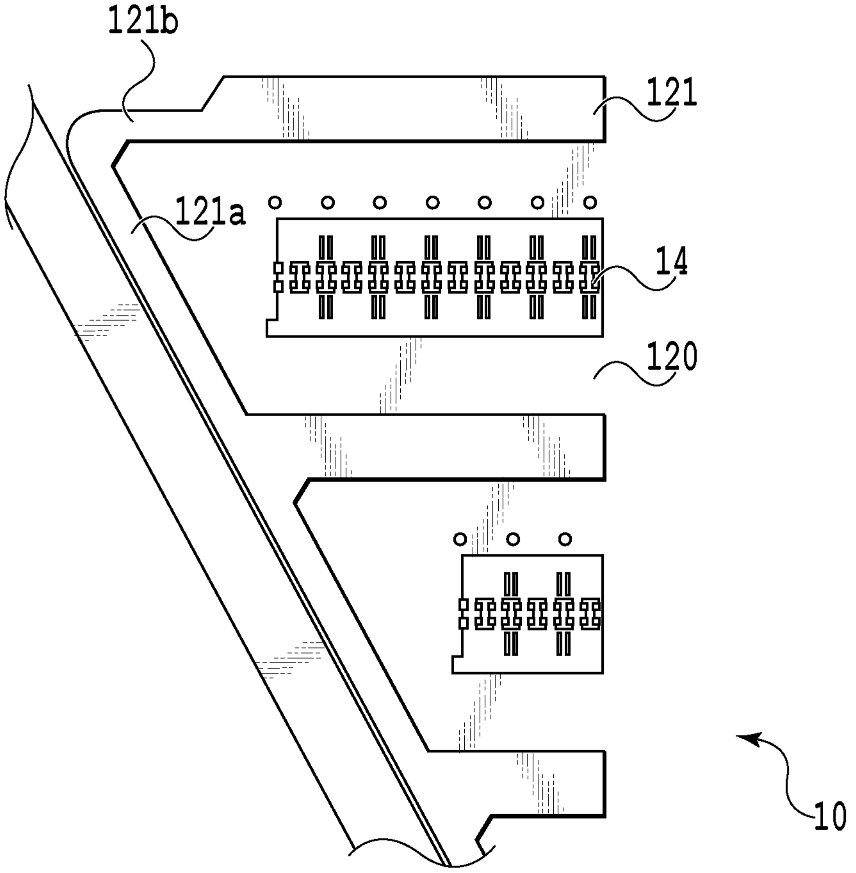
FIG. 26 is a schematic partial enlarged view showing a printing element substrate of a liquid ejection head according to a seventh embodiment.

FIG. 26 is a schematic view of a part of a simplified printing element substrate representing a modification of FIG. 25.

As a seventh embodiment, as shown in FIG. 26, a shape may be adopted in which a groove width in a transverse direction of a part of the recessed part 121 in the intersecting part of the recessed part 121 and the recessed part 121*a* is a same width as the width in the transverse direction of the recessed part 121*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-211846, filed Dec. 28, 2022, and No. 2023-175278 filed Oct. 10, 2023, which are hereby incorporated by reference herein in their entirety.

What is claimed is:

1. A liquid ejection head, comprising:

a printing element substrate including an ejection surface provided with a first ejection orifice array and a second ejection orifice array, each including a plurality of ejection orifices configured to eject a liquid, the first ejection orifice array and the second ejection orifice array being arranged relative to one another in a direction intersecting with an array direction in which the ejection orifices of the first ejection orifice array are arrayed; and a protective member provided with a first opening corresponding to the first ejection orifice array and a second opening corresponding to the second ejection orifice array, wherein the protective member is arranged adjacent to the ejection surface of the printing element substrate via an adhesive arranged between the first ejection orifice array and the second ejection orifice array, wherein a recessed part is formed on the ejection surface and the adhesive is applied to the recessed part, and wherein the recessed part is formed so as to enclose each of the first ejection orifice array and the second ejection orifice array.

2. The liquid ejection head according to claim 1, wherein the adhesive is intermittently applied in array directions of the first ejection orifice array and the second ejection orifice array.

3. The liquid ejection head according to claim 1, wherein the adhesive is continuously applied in array directions of the first ejection orifice array and the second ejection orifice array.

4. The liquid ejection head according to claim 1, wherein another recessed part is further formed on the ejection surface on an outer side of the recessed part, which is formed so as to enclose each of the first ejection orifice array and the second ejection orifice array.

5. The liquid ejection head according to claim 4, wherein the recessed part and the other recessed part are connected in a groove shape.

6. The liquid ejection head according to claim 5, wherein a width of the recessed part and the other recessed part is shorter than a beam width between the first and second openings of the protective member.

7. The liquid ejection head according to claim 6, wherein the ejection surface has repellency with respect to the liquid and the recessed part and the other recessed part have non-repellency with respect to the liquid.

8. The liquid ejection head according to claim 7, wherein the ejection surface is made of resin.

9. The liquid ejection head according to claim 8, wherein a ratio of a total area of the first and second openings to an area of a main face of the protective member is 70% or lower.

10. The liquid ejection head according to claim 9, wherein a width of the respective first and second openings is equal to or longer than a diameter of the respective ejection orifices and less than an interval between the first ejection orifice array and the second ejection orifice array, and a thickness of the protective member is equal to or thinner than a thickness of the printing element substrate.

11. The liquid ejection head according to claim 10, wherein a width of the respective first and second openings is 200 μm or more and a thickness of the protective member is less than 50 μm.

12. The liquid ejection head according to claim 11, wherein an opening or a notch is formed in the protective member in conformity with an alignment mark, a printing element substrate number, or an ejection orifice number provided on the printing element substrate.

13. The liquid ejection head according to claim 12, wherein the notch is formed in a rounded shape.

14. The liquid ejection head according to claim 13, wherein corners of the protective member are formed in a rounded shape.

15. The liquid ejection head according to claim 14, wherein a material of the protective member has a higher modulus of elasticity than that of a material of the ejection orifices.

16. The liquid ejection head according to claim 15, wherein a material of the protective member has a same coefficient of linear expansion as that of a material of the printing element substrate.

17. The liquid ejection head according to claim 16, wherein the protective member is made of metal.

18. The liquid ejection head according to claim 17, wherein the protective member is made of stainless steel.

19. The liquid ejection head according to claim 18, wherein an adhesion layer is formed on at least a side of the ejection surface of the protective member.

20. The liquid ejection head according to claim 19, wherein the printing element substrate is arrayed in plurality on a flow path member so that at least parts overlap with each other.

21. The liquid ejection head according to claim 20, wherein the liquid ejection head is a line head corresponding to a width of a printing medium.

22. The liquid ejection head according to claim 1, further comprising:

an energy generating element used to eject the liquid; and a pressure chamber internally including the energy generating element, wherein the liquid in the pressure chamber is circulated between inside and outside of the pressure chamber.

23. The liquid ejection head according to claim 1, wherein a groove in a first direction in which the recessed part is formed between the first ejection orifice array and the second ejection orifice array and a groove in a second direction which intersects with the groove in the first direction are formed, and the recessed part is shaped such that a width of the recessed part in which the groove in the second direction is formed is narrower than an average width of the recessed part which is formed in the groove in the first direction.

24. The liquid ejection head according to claim 23, wherein an average width of the groove in the first direction is 80 μm or more and 150 μm or less and a width of the groove in the second direction is 20 μm or more and 70 μm or less.

25. The liquid ejection head according to claim 23, wherein an intersecting part of the groove in the first direction and the groove in the second direction has a chamfered shape.

26. The liquid ejection head according to claim 23, wherein only an acute angle part of an intersecting part of the groove in the first direction and the groove in the second direction has a chamfered shape.

27. The liquid ejection head according to claim 23, wherein a width between the groove in the second direction and a chip end in an ejection orifice array direction is 5 μm or more and 20 μm or less.

* * * * *